(12) United States Patent
Kenington et al.

(10) Patent No.: US 8,774,109 B2
(45) Date of Patent: Jul. 8, 2014

(54) MOBILE COMMUNICATIONS NETWORK WITH DISTRIBUTED PROCESSING RESOURCES

(75) Inventors: Peter Kenington, Chepstow (GB); Ken Hawk, Palo Alto, CA (US)

(73) Assignee: Kathrein-Werke KG, Rosenheim (DE)

( * ) Notice: Subject to any disclaimer, the term of this patent is extended or adjusted under 35 U.S.C. 154(b) by 519 days.

(21) Appl. No.: 12/817,871

(22) Filed: Jun. 17, 2010

(65) Prior Publication Data

US 2011/0310810 A1    Dec. 22, 2011

(51) Int. Cl.
| | |
|---|---|
| H04W 4/00 | (2009.01) |
| H04J 3/00 | (2006.01) |
| H04J 3/06 | (2006.01) |
| H04B 15/00 | (2006.01) |
| H04B 1/38 | (2006.01) |

(52) U.S. Cl.
USPC ............................ 370/329; 370/336; 370/350

(58) Field of Classification Search
None
See application file for complete search history.

(56) References Cited

U.S. PATENT DOCUMENTS

| | | | |
|---|---|---|---|
| 4,712,229 A | 12/1987 | Nakamura | |
| 6,236,860 B1 | 5/2001 | Hagting et al. | |
| 6,353,600 B1 | 3/2002 | Schwartz et al. | |
| 6,625,421 B1 | 9/2003 | Harada et al. | |
| 6,751,467 B1 | 6/2004 | Cameron et al. | |
| 6,785,558 B1 * | 8/2004 | Stratford et al. | 455/561 |
| 7,664,534 B1 | 2/2010 | Johnson | |
| 2002/0037730 A1 | 3/2002 | Schwartz | |
| 2004/0110534 A1 | 6/2004 | Chung et al. | |
| 2004/0213367 A1 | 10/2004 | Han | |
| 2005/0157675 A1 | 7/2005 | Feder et al. | |
| 2006/0222087 A1 | 10/2006 | Bauman et al. | |
| 2007/0058742 A1 | 3/2007 | Demarco et al. | |
| 2008/0137691 A1 | 6/2008 | Barry et al. | |
| 2009/0170543 A1 * | 7/2009 | Mostafa et al. | 455/502 |
| 2009/0191891 A1 | 7/2009 | Ma et al. | |
| 2009/0262732 A1 | 10/2009 | Wood | |
| 2009/0309469 A1 | 12/2009 | Wayman | |
| 2010/0099426 A1 | 4/2010 | Lozinski et al. | |
| 2010/0238840 A1 * | 9/2010 | Lu et al. | 370/259 |
| 2011/0082935 A1 * | 4/2011 | Zetterman et al. | 709/226 |
| 2011/0283203 A1 * | 11/2011 | Periyannan et al. | 715/753 |

FOREIGN PATENT DOCUMENTS

EP    1085773    3/2001

OTHER PUBLICATIONS

International Preliminary Report issued in PCT/EP11/58534 on Jan. 3, 2013.

* cited by examiner

*Primary Examiner* — Chirag Shah
*Assistant Examiner* — Srinivasa Reddivalam
(74) *Attorney, Agent, or Firm* — Stephen H. Eland; Dann, Dorfman, Herrell & Skillman

(57) ABSTRACT

A mobile communications network is disclosed which comprises a plurality of radio heads, a cloud processing architecture, and a plurality of radio head links. The plurality of radio heads are for transceiving radio signals and for converting the radio signals between baseband representations of the radio signals and radio frequency representation of the radio signals. The cloud processing architecture is for processing the baseband representations of the radio signals. The cloud processing architecture is ad hoc shareable on demand between different ones of the plurality of radio heads. The plurality of radio head links is provided between the plurality of radio heads and the cloud processing architecture. A corresponding method for processing radio signals for a mobile communications network and corresponding computer program products are also disclosed.

19 Claims, 14 Drawing Sheets

(PRIOR ART)  FIG. 2

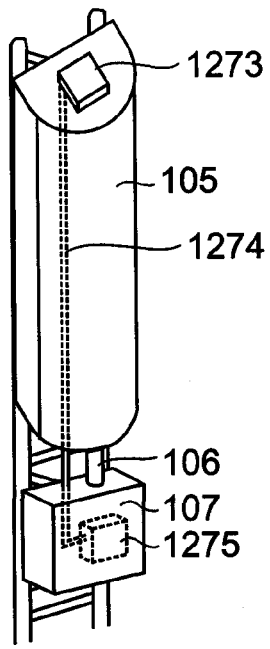
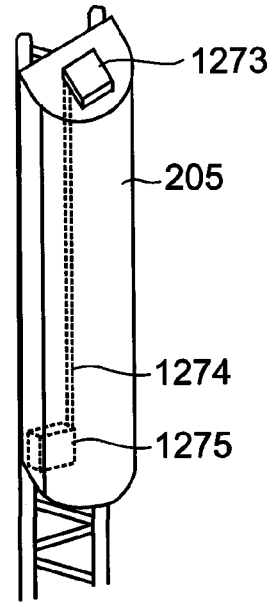
FIG. 12   FIG. 13
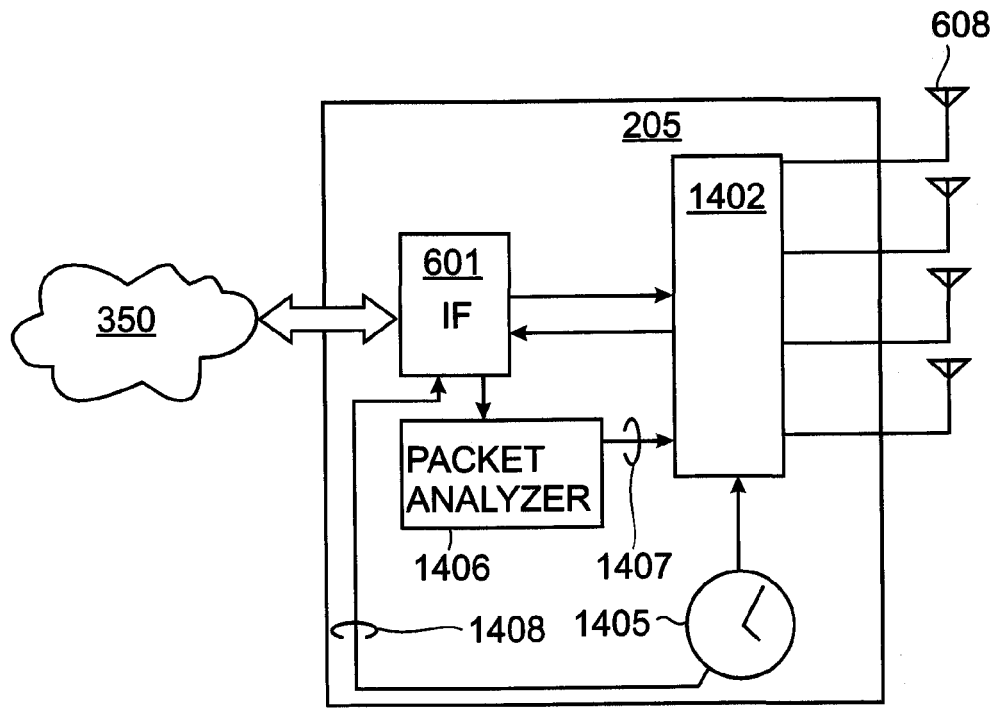
FIG. 14

MOBILE COMMUNICATIONS NETWORK WITH DISTRIBUTED PROCESSING RESOURCES

CROSS REFERENCE TO OTHER APPLICATIONS

This application is related to U.S. patent application Ser. No. 12/817,879 entitled "HANDOVER IN MOBILE COMMUNICATIONS NETWORK", filed Jun. 17, 2010. The present application is related to U.S. patent application Ser. No. 12/817,892 entitled "REMOTE RADIO HEAD", filed Jun. 17, 2010. The present application is related to U.S. patent application Ser. No. 12/817,901 entitled "REMOTELY LOCATED RADIO TRANSCEIVER FOR MOBILE COMMUNICATIONS NETWORK", filed Jun. 17, 2010. The entire contents of each the foregoing applications are incorporated herein by reference.

FIELD OF THE INVENTION

The field of the invention relates to a mobile communications network and to a method for processing radio signals for the mobile communications network. The field of the present invention also relates to a computer program product enabling a foundry to carry out the manufacture of a chip for the mobile communications network, and to a computer program product enabling a mobile communications network to execute a method for processing radio signals.

BACKGROUND OF THE INVENTION

The use of mobile communications networks has increased over the last decade. Operators of the mobile communications networks have increased the number of base stations and/or base transceiver stations (BTS) in order to meet an increased demand for service by users of the mobile communications networks. The operators of the mobile communications networks wish to reduce the costs associated with installing and operating the base stations. This wish for cost reduction has led network operators and manufacturers of network infrastructure to come up with new concepts for the network architecture. One of these architectures is known as "BTS Hoteling". In the BTS Hoteling approach, the remote radio head is moved further from the remainder of the BTS, to enable the remainder of the BTS to be co-located with similar parts of other BTSs (for an entire city, for example) to form a BTS hotel. The BTS Hoteling approach involves all of the baseband/control/transport parts of a number of base stations being housed at the same location (e.g. for ease of maintenance and to save housing costs). The BTS hotel and the remote radio head(s) are connected by means of dedicated fibre-optic or microwave point-to-point links, for example, from the BTS baseband sections to their respective remote radio heads.

In current mobile network architectures, there is typically a 1-to-1 relationship between BTS baseband hardware deployments and radio frequency (RF) hardware deployments. In other words, if a particular BTS has a maximum capability of supporting a number of X users (or the data equivalent) on Y carriers, then both the RF and baseband hardware elements are capable of fully supporting this number of users, at each and every site in the network employing that particular BTS design. In other words, each BTS site should be dimensioned for the amount of communication traffic during peak hours. A large portion of the traffic handling capacity of different ones of the BTS sites is not utilised during off-peak hours. The hours that constitute 'peak' hours will vary from site to site; for example, a city centre site may experience its peak hours during the working day, whereas a suburban site may experience its peak hours during the morning and evening commuting times.

SUMMARY OF THE INVENTION

It would be desirable to improve the cost-effectiveness of a mobile communications network. This desire and/or possible other desires are addressed by a mobile communications network that comprises a plurality of radio heads, a cloud processing architecture, and a plurality of radio head links. The plurality of radio heads is provided for transceiving radio signals and for converting the radio signals between baseband representations of the radio signals and radio frequency representations of the radio signals. The cloud processing architecture is provided for processing the baseband representations of the radio signals. The cloud processing architecture is ad-hoc shareable on demand between different ones of the plurality of radio heads. The plurality of radio head links is provided between the plurality of radio heads and the cloud processing architecture.

This proposed architecture of a mobile communications network acknowledges that a given mobile communications network is never fully utilised at all of its BTS sites simultaneously. It may be, for example, that a suburban part of the mobile communications network is heavily loaded as commuters enter and leave the city in the morning and evening, with the city centre part of the mobile communications network being relatively lightly loaded at this time. Likewise, the opposite will probably be true during the main business day.

The remote radio head is defined as a unit that typically combines the following components: power supply, transceiver, amplifier, power amplifier and/or low-noise amplifier, and duplex filter. This is, however, only exemplary. The remote radio head is installed close to the antenna, or the remote radio head may be merged with the actual antenna, resulting in an active antenna. As used in this document the term "radio head" refers to both, a separate remote radio head and the functionality of a radio head integrated into the active antenna.

The term "baseband" describes, from a perspective of the radio head, a frequency range at a core-network facing side of the radio head. Accordingly, the baseband frequency range is lower in frequency than the radio frequency range. It is however, not necessary for the baseband frequency range, as defined and used herein, to coincide with a baseband frequency range used in other parts of the mobile communications network. The term "baseband" as used in this disclosure could also be applied to, e.g., an intermediate frequency.

The radio heads are capable of transceiving radio signals which means that they are capable of transmitting radio signals, receiving radio signals, or both. Converting the radio signals between baseband representations of the radio signals and radio signal representations of the radio signals is performed by the radio heads so that each radio head usually provides the hardware necessary for converting the radio signals. However, converting the radio signals between baseband and radio frequency is typically straightforward so that the radio head can be relatively "dumb". The cloud processing architecture makes it possible to process the baseband representations of the radio signals belonging to different ones of the plurality of radio heads at a reduced number of processing entities, compared to the 1-to-1 approach of the prior art. The processing entities that form the cloud processing architecture are sharable between the different ones of the plurality of radio heads.

In one aspect of the teachings disclosed herein, the cloud processing architecture may comprise non-dedicated processing resources which are shareable between different ones of the plurality of radio heads.

In one aspect of the teachings disclosed herein, the mobile communications network may further comprise a base station and a packet-based base station link between the base station and the cloud processing architecture. This mobile communications network structure allows outsourcing of e.g. computationally intensive signal processing tasks from the base station to the cloud processing architecture. For example, each base station may have a basic processing capacity sufficient for off-peak demand. The packet-based base station link makes it possible to assign a portion of the signal processing tasks to the cloud processing architecture during peak demand.

The mobile communications network may further comprise a radio head timing reference. The radio head timing reference may be used to synchronise the transmission and/or the reception of the radio signals at the plurality of radio heads. The radio head timing reference is usually integrated with at least one radio head of the plurality of radio heads. In the alternative, the radio head timing reference may be installed in close vicinity to at least one radio head of the plurality of radio heads. The radio head timing reference may be useful to compensate for delays introduced by the plurality of radio head links, in particular, when these delays are time-varying and/or random.

In one aspect of the teachings disclosed herein, the mobile communications network may further comprise a base station timing reference and/or a cloud processing architecture timing reference. The various timing references may be used to synchronise the shared processing of the baseband representations of the radio signals.

In another aspect of the teachings disclosed herein, the mobile communications network may further comprise a public switched telephone network (PSTN) link as a part of the plurality of radio head links. Utilisation of an already existing PSTN link may significantly reduce the costs of the plurality of radio head links. Ideally, a major part of the distance between an individual one of the plurality of radio heads and the cloud processing architecture can be covered by the PSTN link.

In one aspect of the teachings disclosed herein, the plurality of radio heads will comprise at least one of an up-convertor and a down-convertor adapted to frequency-convert the radio signals. Modern mobile communications networks typically use a frequency between approximately 500 MHz and 5 GHz for the communication between the plurality of radio heads and the mobile stations (handsets). The transmission of the radio signals over the plurality of radio head links at these frequencies would make high demands on the radio head links. With the frequency-conversion being performed at the plurality of radio head links, these high demands may be substantially relaxed.

In one aspect of the teachings disclosed herein, the demand for allocating a share of the cloud processing architecture may be based on a number of users connected to a given radio head. The demand may be determined by software running in the cloud processing architecture.

In addition to or in the alternative, the demand for allocating a share of the cloud processing architecture may be based on an amount of data downloaded or uploaded via the radio head. This enables, under normal circumstances, that an individual one of the plurality of radio heads has a share of the cloud processing architecture at its disposal sufficient for its signal processing needs at a given time.

The disclosure also teaches a method for processing radio signals for a mobile communications network. The method comprises:
 a. transceiving the radio signals;
 b. converting the radio signals between baseband representations of the radio signals and radio frequency representations of the radio signals;
 c. passing packets of the baseband representations of the radio signals between a plurality of a radio heads and a plurality of non-dedicated processing resources; and
 d. ad-hoc allocating on demand a share of a non-dedicated processing resource, from among the plurality of sharable processing resources, for processing the baseband representations of the radio signals in the allocated share of the processing resource.

In one aspect of the teachings disclosed herein, the plurality of non-dedicated processing resources may be organised as a cloud processing architecture.

The method may further comprise passing packets of base station-related data between a base station and the plurality of non-dedicated processing resources via a packet-based base station link.

In one aspect of the teachings disclosed herein, the method may further comprise providing a radio head timing reference locally to at least one radio head in the plurality of radio heads. In addition, or in the alternative, a base station timing reference may be provided locally to a base station that is part of the mobile communications network, or a timing reference may be provided locally to at least one non-dedicated processing resource of the plurality of non-dedicated resources.

The packets of the baseband representations of the radio signals may be passed over a PSTN network.

In one aspect of the teachings disclosed herein, the method may further comprise frequency-converting the radio signals at a radio head of the plurality of remote radio heads.

In one aspect of the teachings disclosed herein, the demand for allocating a share of the cloud processing architecture may be based upon a number of users connected to a given radio head. In addition, or alternatively, the demand for allocating a share of the cloud processing architecture may be based upon an amount of data downloaded or uploaded via the radio head.

The disclosure also teaches a computer program product comprising a non-transitory computer-usable medium having control logic stored therein for causing a computer to manufacture a mobile communications network comprising:
 a. a plurality of radio heads for transceiving radio signals and for converting the radio signals between baseband representations of the radio signals and radio frequency representations of the radio signals;
 b. a cloud processing architecture for processing the baseband representations of the radio signals and being ad-hoc shareable on demand between different ones of the plurality of radio heads; and
 c. a plurality of radio head links between the plurality of radio heads and the cloud processing architecture.

In yet a further aspect of the teachings disclosed herein, a computer program product is disclosed which comprises a non-transitory computer-usable medium having control logic stored therein for causing a mobile communications network to execute a method for processing baseband representations of radio signals for a mobile communications network comprising:

a. Transceiving the radio signals;
b. Converting the radio signals between the baseband representations of the radio signals and radio frequency representations of the radio signals;
c. Passing packets of the baseband representations of the radio signals between a plurality of radio heads and plurality of non-dedicated processing resources;
d. Ad-hoc allocating on demand a share of the non-dedicated processing resources, from among the plurality of shareable processing resources, for processing the baseband representations of the radio signals; and
e. Processing the baseband representations of the transceived radio signals in the allocated share of the processing resource.

As far as technically meaningful, the technical features disclosed herein, may be combined in any manner. At least parts of the mobile communications network and the method for process radio signals may be implemented in software, in hardware, or as a combination of both software and hardware.

BRIEF DESCRIPTION OF THE DRAWINGS

FIG. 12 shows a remote radio head and a corresponding (passive) antenna according to one of the teachings disclosed herein.

FIG. 13 shows an active antenna according to one of the teachings disclosed herein.

FIG. 14 shows a schematic block diagram of an active antenna according to one of the teachings disclosed herein.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiments of the invention can be combined with a feature of a different aspect or aspects and/or embodiments.

Figure 1:
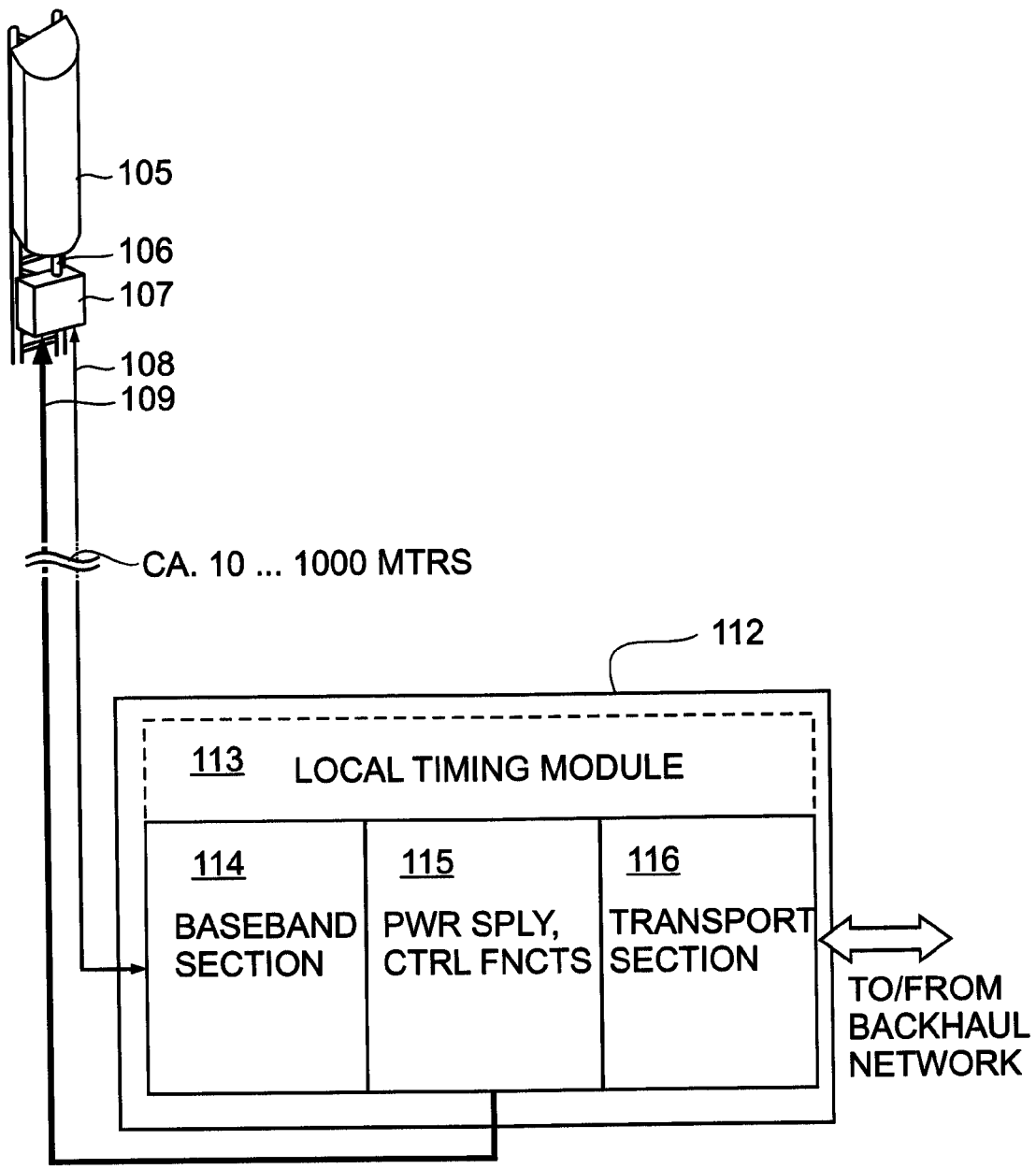
FIG. 1 shows a base station architecture according to the prior art in a schematic manner.

FIG. 1 shows a typical example of an existing base station architecture when utilizing a remote radio head 107. The remote radio head (RRH) 107 is connected directly to a baseband card/module 114 of a base station or a base station rack 112, typically using a fibre-optic cable 108 to transfer the high-speed digital signals which describe the carrier information to be transmitted (e.g. using OBSAI protocol or CPRI protocol). In addition to a data connection provided for by the fibre-optic cable 108, the remote radio head 107 also requires a power feed to provide electrical power to the remote radio head 107. In FIG. 1, the remote radio head 107 receives electrical power by means of a power supply cable 109 and a power supply unit 115 of the base station 112. The electrical power could also be supplied to the remote radio head 107 via an AC feed from a mains supply that is local to the remote radio head 107. AC electrical power is, in this case, converted to DC electrical power by means of a local power supply near or within the remote radio head 107. The local power supply may be chosen if the distance between the remote radio head 107 and the remainder of the base station 112 is large. There is a single base station equipment rack 112, including baseband and transmission resources, for each BTS site. This resource may be common to a number of sectors on that site, but even in this case, there is usually a one-to-one relationship between baseband cards 114 (for example) and antennas/sectors.

The base station rack 112 comprises a transport section 116 which is used to connect the base station rack 112 with a backhaul network. The backhaul network is typically based on T1/E1 lines or microwave links.

The digital signals are transferred directly from the base station's baseband circuits to the remote radio head 107 with a defined (known) distance or transmission delay between the baseband circuits and the remote radio head 107. This transmission delay should be known, and taken into account by the BTS (or sufficiently small as to be insignificant), as the delay between packets being transmitted by the transmit antenna and received by the receive antenna (which are typically one and the same antenna) is a determinant of the cell's radius. If the transmission delay between the baseband circuits and the remote radio head is not taken into account, in both the transmit (downlink) and receive (uplink) directions, then the cell's radius will be unnecessarily compromised (reduced), irrespective of the power level transmitted. It will also, in many systems, have an impact upon handover performance and this will, in turn, impact the quality of service experienced by a user of the system.

In some BTS installations, a local absolute timing reference is provided, often utilizing a GPS receiver. The base station or base station rack 112 shown in FIG. 1 comprises a local timing module 113. A local absolute timing reference utilizing a GPS receiver provides a very accurate indication of absolute time, typically based on Coordinated Universal Time (UTC) or Greenwich Mean Time (GMT), and enables all of the base stations in a mobile communications network to be accurately synchronized. This is necessary in some CDMA systems, for example, to enable soft-handover to operate correctly. This timing information forms the basis for the timing used by the remote radio head 107, since the BTS rack 112 and the remote radio head 107 are directly connected.

The remote radio head 107 and the antenna 105 are connected by a coaxial cable 106.

In recent years, so called active antennas were developed and are deployed in the field in increasing numbers. In the case of an active antenna, the remote radio head and the antenna merge to form a single structure. Accordingly, an active antenna may replace the remote radio head 107, the coaxial cable 106, and the antenna 105 of the architecture shown in FIG. 1. Note that the term "remote radio head", as used in this disclosure, also applies to active antennas, because an active antenna may be regarded as a remote radio head with an embedded antenna or a plurality of embedded antenna elements.

Figure 2:
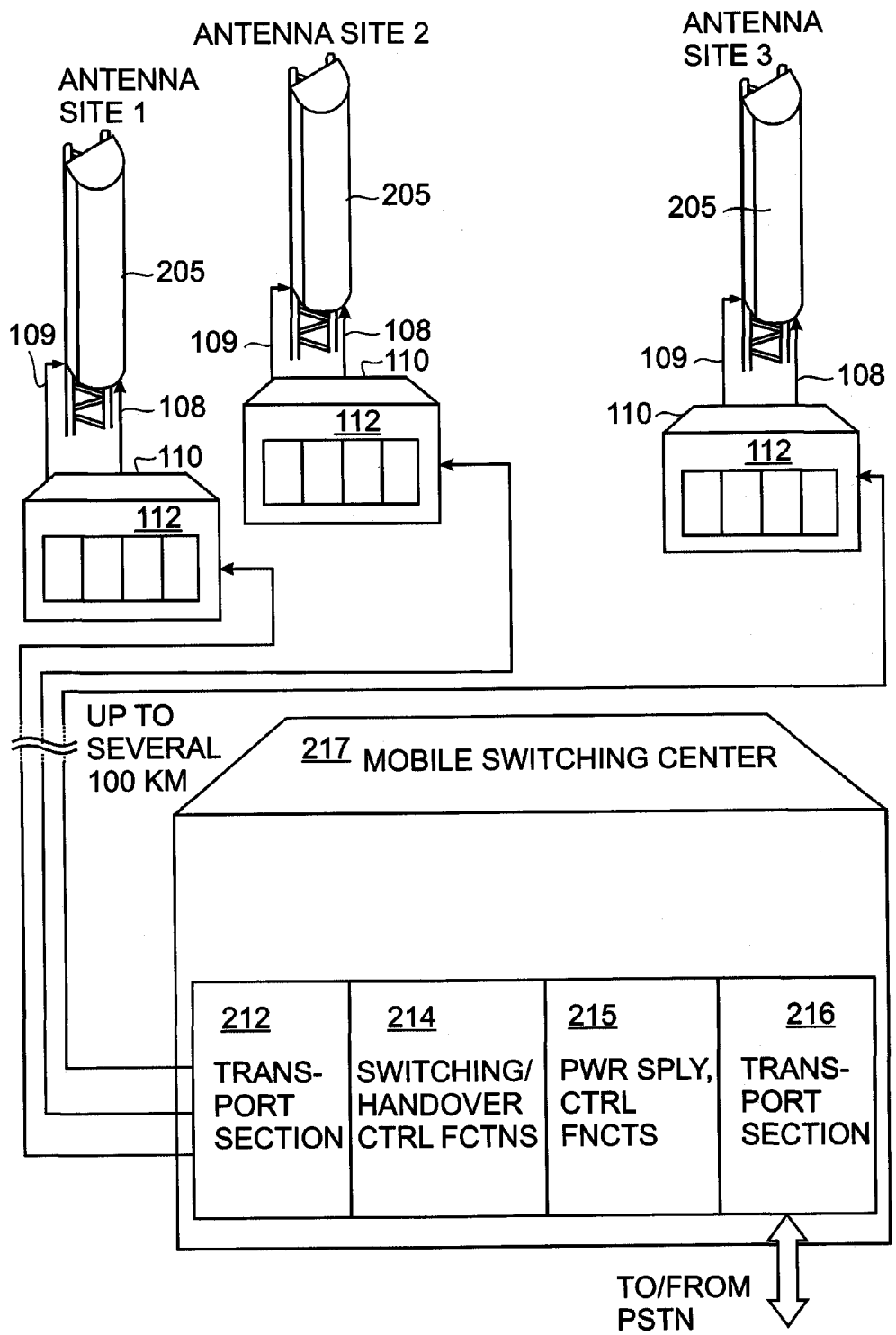
FIG. 2 shows a portion of a mobile communications network according to the prior art in a schematic manner.

FIG. 2 shows a typical conventional mobile communications network architecture. In this system, one BTS cabin 112 is provided per site. Note that only single-sector sites are shown here. The BTS cabins 112 are connected to a centralized switching centre 217 of some form. It is this centralized resource which manages the process of re-routing user data packets or voice circuits from one BTS to another when a user is handed over from one site to another as he/she moves within the mobile communications network.

The mobile switching centre 217 comprises a first transport section 212 to connect the mobile switching centre 217 with the base stations 112 within the base station cabins 110. As mentioned above, this connection is achieved by means of the backhaul network. The lines connecting the base stations 112 with the mobile switching centre 217 may be, for example, T1/E1 lines, fibre-optic systems (e.g. SONET, SDH), DSL, terrestrial microwave links, etc.

Note that in some systems, the connection between the BTS and the switching centre may not be a direct one. In UMTS systems, for example, a radio network controller (RNC) is connected between a base station (or typically a number of base stations, referred to as 'Node B's) and the switching centre. Whilst the precise configuration of the network varies for the different standards (e.g. UMTS, CDMA, LTE, WiMAX etc.), the principle of a base station connecting (either directly or indirectly) to some form of switching centre or network control centre remains.

Each of the base stations 112 is connected to an active antenna 205 by means of a fibre-optic cable 108 to/from BTS baseband section and by means of a power supply cable 109.

The mobile switching centre 217 further comprises a switching/handover module 214 which manages switching and handover control functions when the handling of the mobile station of a user needs to be transferred from one antenna site to another antenna site. The handover process involves the transmission of large amounts of data all the way back to this centralized resource, the mobile switching centre 217. The mobile switching centre 217 could be hundreds of miles away from the two antenna sites involved in the handover process. These two antenna sites may only be a few hundred meters apart. Accordingly, the handover process is potentially very wasteful of fixed-line transmission bandwidth.

The mobile switching centre 217 also comprises a power supply unit 215 and associated control functions. The mobile switching centre 217 is connected to a public switched telephone network (PSTN) via a transport section 216.

Figure 3:
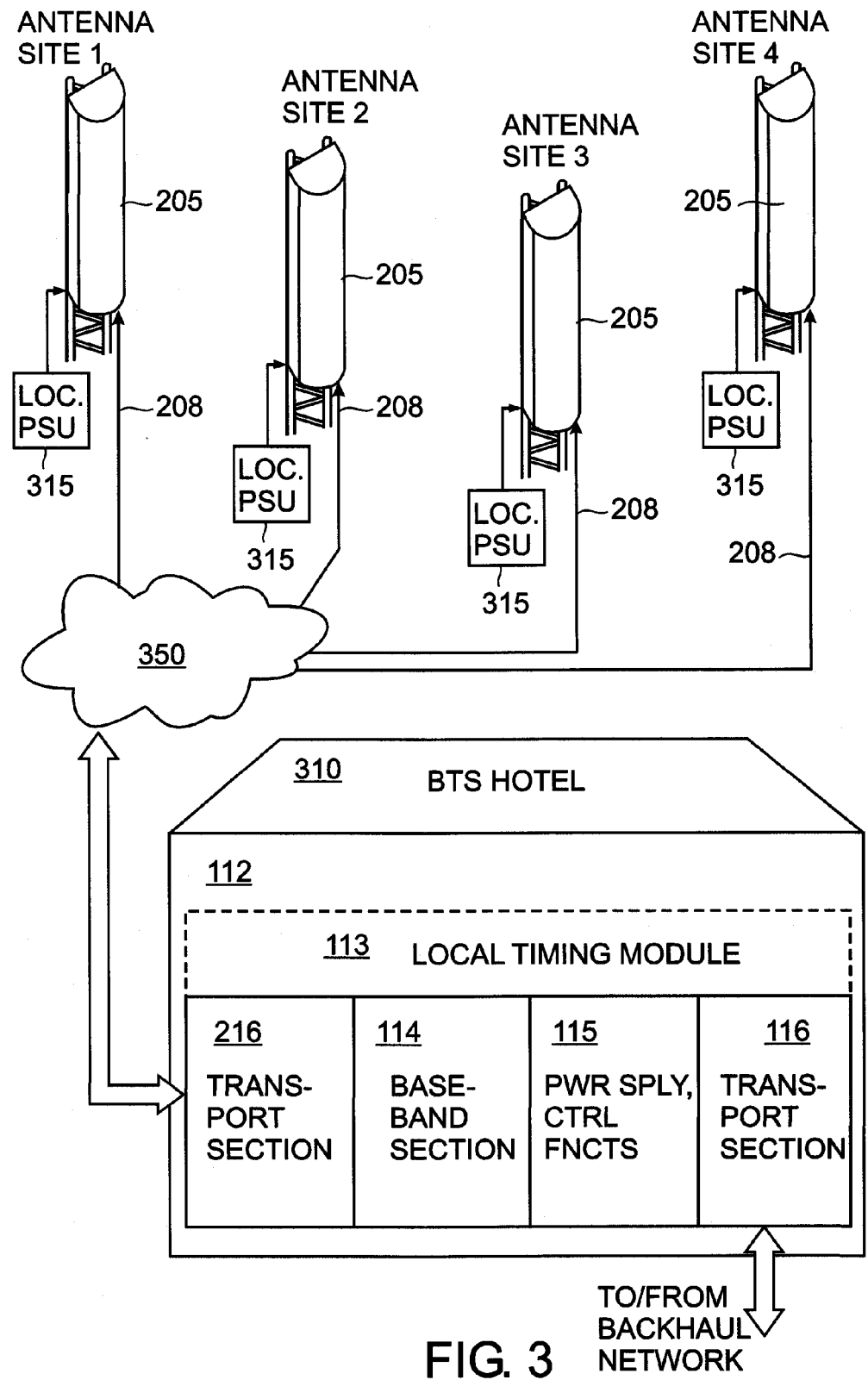
FIG. 3 shows, in a schematic manner, an active antenna-based BTS/network architecture using switched/public networks according to one of the teachings disclosed herein.

FIG. 3 shows a base station architecture according to the teachings disclosed herein. In this architecture, several base stations are combined to form a structure known as a "BTS hotel". The purpose of the BTS hotel is the ability to enable the remote radio head or the active antenna to be moved further from the remainder of the base station, and thereby to enable the remainder of the base station to be co-located with similar parts of other base stations (for an entire city, for example). This BTS hoteling approach involves all of the baseband/control/transport parts of a number of base stations being hosted at the same location (e.g. for ease of maintenance and to save hosting costs).

In the base station architecture illustrated in FIG. 3, each active antenna has its own local power supply unit (PSU) 315. Known BTS hoteling structures relied on dedicated links between the BTS hotel 310 and an individual one of the active antennas 205 or remote radio head(s) 107 for communicating data between these two units. The antenna site may be relatively far away from the BTS hotel 310. For example, the BTS hotel 310 could serve an entire city so that some of the antenna sites could be at a distance as much as several tens of kilometers. In BTS hoteling scenarios of the prior art, the presence of a dedicated link between the antenna site and the BTS hotel was typically believed to be inevitable due to the transmission delay issues mentioned above. Providing dedicated links over large distances is expensive, especially in cities where streets would have to be dug up.

The architecture shown in FIG. 3 replaces the dedicated links with connections provided by an available communications network, e.g. a public communications network based on optical fibre or DSL. The transmission delay issue can be addressed by technical features which will be explained below. Note that some types of public telecommunications network may have acceptable transmission delays or transmission delays which can be measured and remain constant. An old-fashioned circuit-switched telephone network having no digital sections is an example of such a communications network. In some countries, especially in emerging markets, these types of public telephone network may still exist and even be operative. Telephone usage is likely to shift from fixed-line communications to mobile communications. Released resources of the public telecommunications network may then be used for BTS hoteling purposes.

The base station components hosted in the BTS hotel in FIG. 3 are similar, in function, to those of FIG. 1, with the exception that the additional transport section 216 is now required to enable the digital baseband signals to be transported across the public or private communications network. Depending on the type of the public or private communications network a packet-allocation/scheduling/routing system may also be required within the transport module 216 on the left-hand side of the BTS hotel diagram. The basic transport mechanism could take a large number of forms, for example: T1/E1 links, IP-based transmission, fibre-optic systems, DSL, terrestrial microwave links, etc. In the case of a packet-switched network 350, the data which is transported needs to be in the form of packets which can be allocated to different antenna sites. In this regard, IP (internet protocol) would be an ideal transportation mechanism and the active antenna systems or the remote radio heads would therefore require IP-based connections to the public (or private) telecommunications network to which they are attached.

Figure 4:
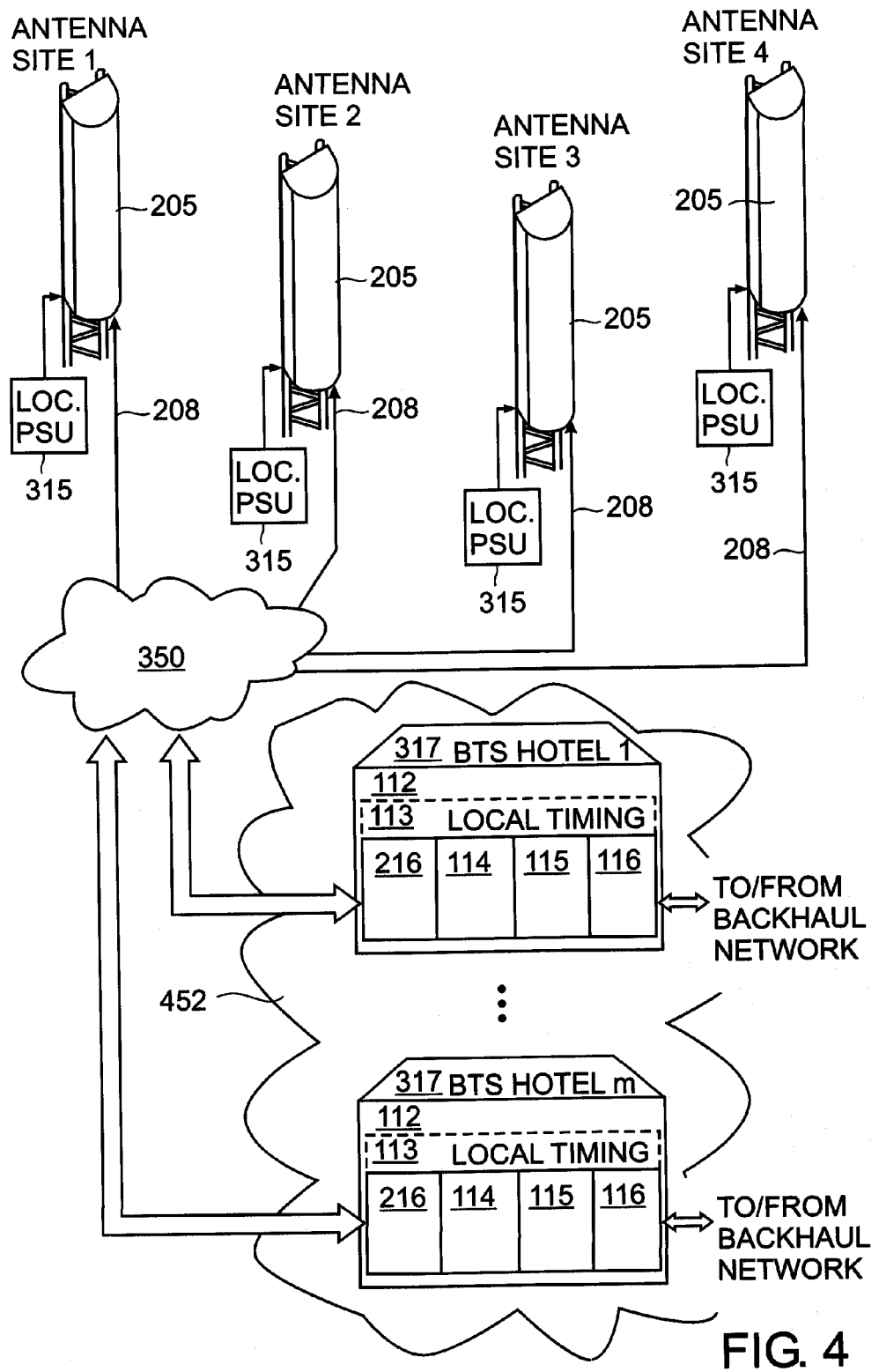
FIG. 4 shows, in a schematic manner, another active antenna-based BTS/network architecture using switched/public networks according to one of the teachings disclosed herein.

FIG. 4 shows a network architecture similar to that shown in FIG. 3. The difference is that in the network architecture of FIG. 4, a plurality of BTS hotels 410 is connected to the public or private communications network 350. This shows that several BTS hotels 410 may be connected to one and the same switched network 350 to communicate with a plurality of active antennas or remote radio heads at a plurality of antenna sites. With the presence of the communications network 350, which may extend over a relatively large geographical area, the assignment of a particular BTS hotel 410 to a particular antenna site is flexible. Moreover, any organisational assignment between BTS hotel 410 and the antenna site may now be resolved, because in principle every BTS hotel of the plurality of BTS hotels attached to the switched network 350 may serve any of the plurality of antenna sites, provided that the BTS hotel has sufficient capacity available. Each BTS hotel 410 may be regarded as a shared processing resource. Note that in the architecture of FIG. 3 the single BTS hotel 310 may equally be regarded as a shared processing resource. In FIG. 4, processing tasks between the BTS hotels 410 may be shared and distributed according to a packet allocation/scheduling scheme 452. The packet allocation/scheduling scheme 452 may be implemented in a self-organizing manner in which each BTS hotel 410 takes over a signal processing task when it has processing resources available. It would also be possible that one of the BTS hotels 410 acts as an allocation manager. Another possibility would be that each antenna site has a default BTS hotel 410 which performs the signal processing tasks for that antenna site under normal circumstances. When the antenna site needs to handle large amounts of traffic, possibly exceeding the default BTS hotel's capacity, the default BTS hotel may assign some signal processing tasks to another BTS hotel, for example by forwarding data packets to the other BTS hotel 410, or by instructing the remote radio head 107 and the other BTS hotel 410 to transmit and receive data from each other.

In both of the architectures of FIG. 3 and FIG. 4, sharing the baseband and transmission resources in the BTS hotel site(s) may be implemented, such that fewer resources are required overall than would have been provided in total at all of the BTS sites, when using a traditional approach. This sharing approach recognizes that the network's resources are effectively never fully utilized across the whole of a network, simultaneously. Given sites may well be fully occupied at given times of the day, but all sites will not be fully used simultaneously at any single point during the day. This approach allows the available resources to be accurately tailored to the peaks in demand, based upon the network as a whole, and not on a site-by-site basis. As such, it will save CAPEX (capital expenditure), since fewer resources need to be provided. The approach is also likely to save OPEX (operational expenditure), since it will take less electricity and less maintenance to run these resources (particularly since many of them will be co-located, thereby greatly simplifying maintenance). Previous BTS hoteling concepts have not enabled sharing of resources. This is now possible due to the advent of "cloud computing" techniques, which can be applied to the radio network problem.

In this approach, the baseband and network transmission resources are not dedicated to a particular BTS site (antenna site), but act as a central processing resource, dedicating their capabilities to which ever BTS sites (antenna sites) require them at a given moment in time. The resources which could be shared include (but are not limited to):

Backhaul capacity
Backhaul data rate
Power supply capacity (for the power supply unit feeding the above elements).

DSP size (e.g. number of gates, transistors, etc.)
DSP processing power (e.g. no. of MIPS, MFLOPS)
Computer memory size As an example, take a mobile communications network of n base stations (or base station sites), as shown in FIG. 2. Suppose that each site would normally be provided with the following resources in order to meet its forecast peak demand:

DSP size: a
DSP processing power: b
Computer memory size: c
Backhaul capacity: d
Backhaul data rate: e
Power supply capacity: f The total resource provided in the mobile communications network would then be:

DSP size: n×a
DSP processing power: n×b
Computer memory size: n×c
Backhaul capacity: n×d
Backhaul data rate: n×e
Power supply capacity: n×f When using the ideas of the teachings disclosed herein, these resources could be reduced to:

DSP size: p×a, wherein p<n
DSP processing power: q×b, wherein q<n
Computer memory size: r×c, wherein r<n
Backhaul capacity: s×d, wherein s<n
Backhaul data rate: t×e, wherein t<n
Power supply capacity: u×f, wherein u<n In the case of FIG. 4, where multiple ones of the BTS hotels are used, the active antenna 205 or the remote radio head 107 does not need to know (and does not care) which of the BTS hotels at different physical locations is supplying the signals the BTS hotel needs to transmit/receive. The large "cloud" is, in essence the packet/scheduling/allocation/routing system 452, which determines which BTS baseband card or DSP resource has the required capacity to deal with a particular item or items of traffic, at a given moment in time. This could be a particular BTS site in its entirety, a particular sector at given site, a particular carrier within a given sector or a particular voice or data call on a given carrier. The BTS hotel could even change allocations on a packet-by-packed basis; the key element is that this process is entirely transparent to both the BTS site (antenna site) and the cell phone or data-card customers using that site.

A further aspect of the teaching of the network architectures of FIGS. 3 and 4 is the ability of the communications network to prioritize the data packets being transmitted, based upon pre-determined criteria (such as the type of service they represent, e.g. video conferencing versus e-mail, or the class of customer, e.g. high-paying corporate client versus private user). Information encoded into a packet header or other known part of the data packet can be used to distinguish an originator (or originator classification, e.g. platinum service client versus bronze service client) of the data packet and the type of service subscribed for (e.g. video conferencing versus e-mail). In the event that the communications network is busy, the BTS hotel 310, 410 can prioritize the data packets the BTS hotel 310, 410 processes (and the packets the BTS hotel 310, 410 sends to the BTS/antenna sites) to provide a higher grade of service to users who have paid for the higher grade of service. The users who have only paid for a low grade of service may experience a slower throughput rate or even a loss of connection in particularly busy periods.

Figure 5:
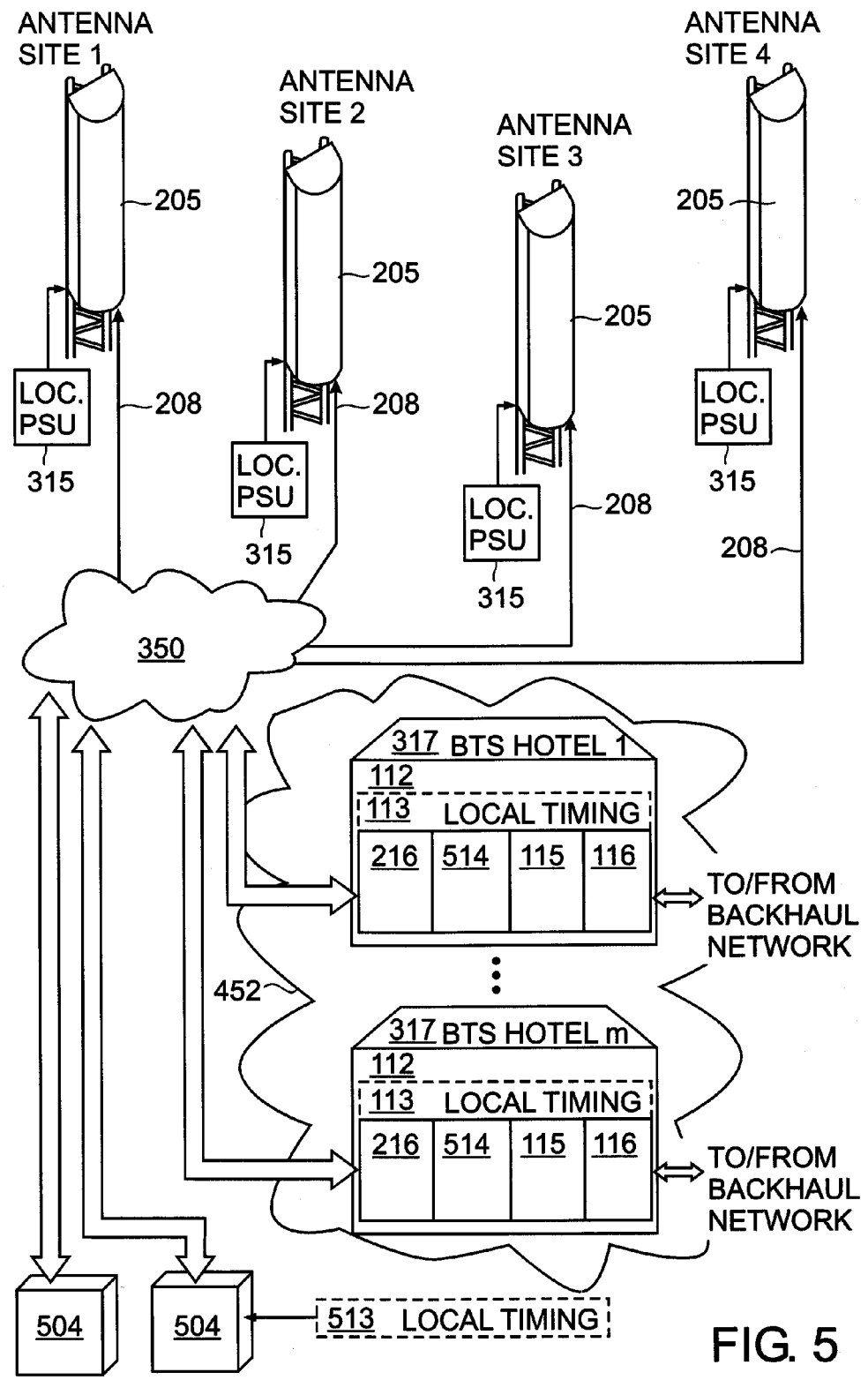
FIG. 5 shows, in a schematic manner, a further active antenna-based BTS/network architecture according to one of the teachings disclosed herein.

FIG. 5 shows another possible network architecture similar to the one shown in FIG. 4. In addition to the BTS hotels 410, one or several additional shared processing resources 504 are connected to the switched network 350. The additional shared processing resources 504 may offer supplementary processing capacity for handling peak demand periods of the mobile communications network. An optional local timing module 513 may be connected to the additional shared processing resource(s) 504. Although not illustrated as such in FIG. 5, the additional shared processing resources may be part of a computing cloud, such as the packet/allocation/scheduling/routing system 452, or be part of a cloud computing environment. The baseband modules of the BTS hotels 410 may be trimmed down baseband sections 514, in terms of processing power and compared to architectures where no additional shared processing resources 504 are available. During off-peak hours the additional shared processing resources 504 might be used for time-insensitive processing tasks, such as compiling usage data for billing purposes or the like.

Figure 6:
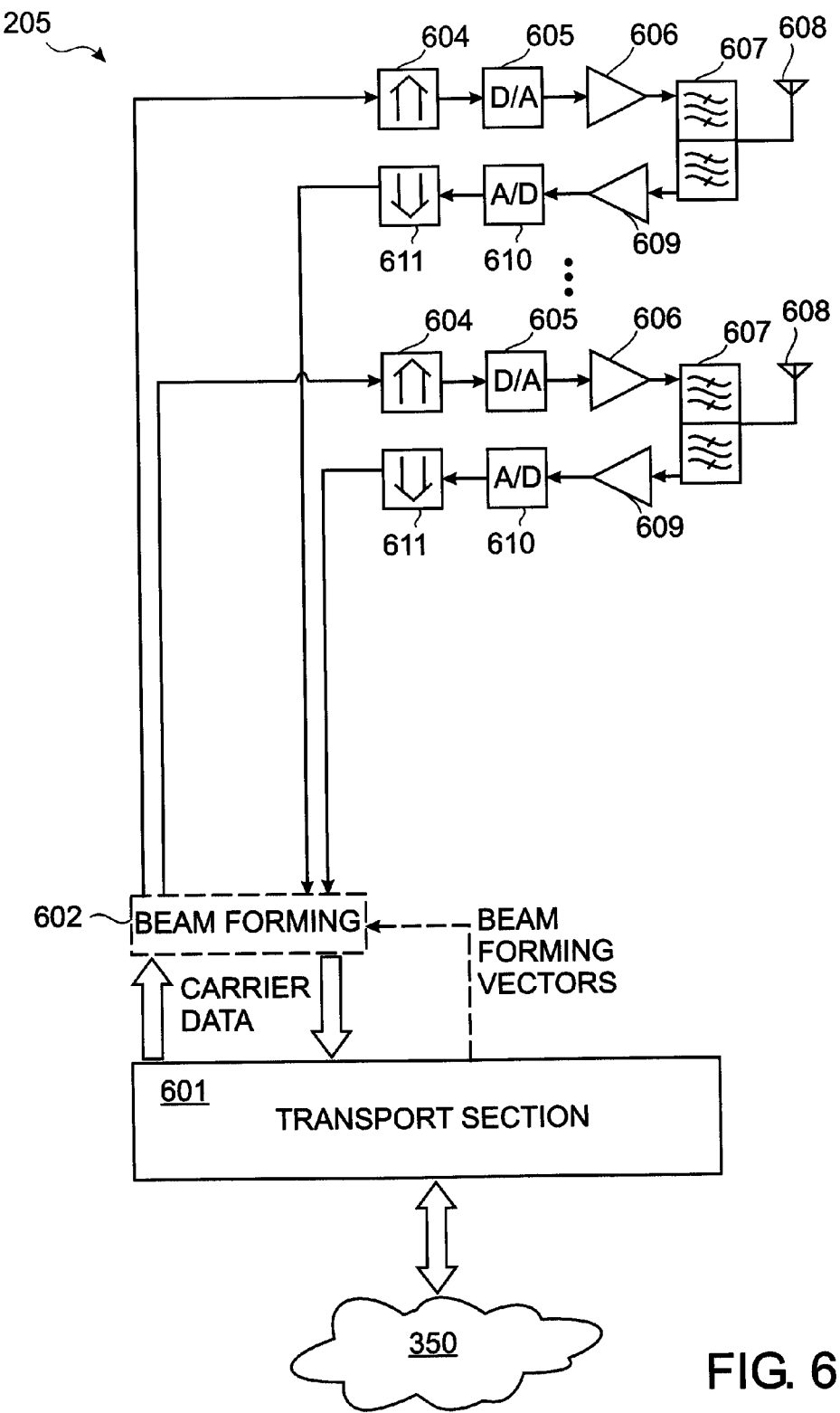
FIG. 6 shows a schematic block diagram of an active antenna according to one of the teachings disclosed herein.

FIG. 6 shows a schematic block diagram of an active antenna array 205 according to the teachings disclosed herein. The active antenna 205 is configured as an active antenna array having a plurality of antenna elements 608 and a plurality of transceiver paths. One transceiver path of the plurality of transceiver paths usually corresponds to, and is connected to, one of the plurality of antenna elements 608. Each of the transceiver paths comprises a duplex filter 607 for separating transmit signals from receive signals in the frequency domain (frequency division duplex, FDD). Other types of duplexing techniques may be used, in which case the duplex filter 607 may be replaced by a suitable element. The antenna element 608 is connected to one side of the duplex filter 607. At the opposite side of the duplex filter 607, a transmit path and a receive path are connected to the duplex filter 607. The receive path is the lower path and will be described first. The receive signals picked up by the antenna element 608 and filtered by the duplex filter 607 are fed to a low noise amplifier (LNA) 609. An amplified receive signal is then digitized in an analogue-to-digital converter 610. In a frequency down-converter 611, frequency down-conversion is then performed on a digitized receive signal generated by the analogue-to-digital converter 610. A down-converted receive signal is then forwarded to a transport section 601 of the active antenna 205 or to an optional beamforming module 602. At the transport section 601 or the optional beamforming module 602, the down-converted receive signals from all receive paths are gathered to be sent over the switched network 350 to one of the BTS hotels 310, 410, for example.

In the transmit direction (downlink) data communication comprising carrier data is received via the switched network 350 at the transport section 601. The carrier data may either be forwarded directly to the transmit paths of the plurality of transceive paths, or they may first be processed in the beamforming module 602 in which they are distributed to the plurality of transmit paths. The transmit signals are frequency up-converted in a frequency up-converter 604, digital-to-analogue-converted in a digital-to-analogue-converter 605, and amplified in an amplifier 606. The amplifier 606 is typically a power amplifier. The amplified transmit signal is fed to the duplex filter 607 to be transmitted by means of the antenna element 608.

The above descriptions of the transmit and receive processing architectures assume the use of delta-sigma or other analogue to digital and digital to analogue converters which are capable of converting to or from the radio frequency carrier frequency directly. Alternative architectures, which utilise analogue up and down conversion in addition to, or in place of, digital up and downconversion are known in the art and may also be used in active antenna transmitter and receiver systems.

One of the interests of using an antenna array is the antenna array's capability to provide beamforming of the electromagnetic field radiated by the antenna. Note that the concept of beamforming also works in the receive direction. In the receive direction, it is the antenna's sensitivity which can be made directional by means of the beamforming technique. Referring back to the transmit case, the beamforming works by slightly modifying the transmit signals applied to the plurality of antenna elements 608 from one antenna element to an adjacent antenna element in phase and/or amplitude. In other words, the transmit signals applied to the various ones of the antenna elements 608 are substantially the same, but slightly shifted with respect to the phase and/or scaled with respect to the amplitude. Due to this similarity, the transmit signals for the plurality of transmit paths can be easily deduced from a master transmit signal. This is done in the beamforming module 602. The beamforming module 602 copies the carrier data received from the transport section 601 for each of the plurality of transmit paths. It then applies a plurality of individual phase shifts to the plurality of transmit signals. It may also scale the plurality of transmit signals in order to adjust the amplitudes of the plurality of transmit signals. Beamforming can be provided at baseband, IF or RF—it is typically performed at baseband on the already-modulated and combined carrier spectrum, just prior to (digital) upconversion and D/A conversion (or D/A conversion followed by I/Q analogue upconversion).

It is also possible that the BTS hotel(s) 310, 410 determine(s) beamforming vectors which are sent to the active antenna 205 via the switched network 350 and are utilized by the beamforming module 602.

A purpose of performing the beamforming at the antenna site is the reduction of data that needs to be transmitted via the communications network 350. In the case of a 16-element antenna array, a reduction by a factor of 16 can be achieved, in theory. The real reduction is likely to be slightly less ideal due to the overhead of the transmission of the beamforming vectors and/or the receive signal relationships over the communications network 350.

Figure 7:
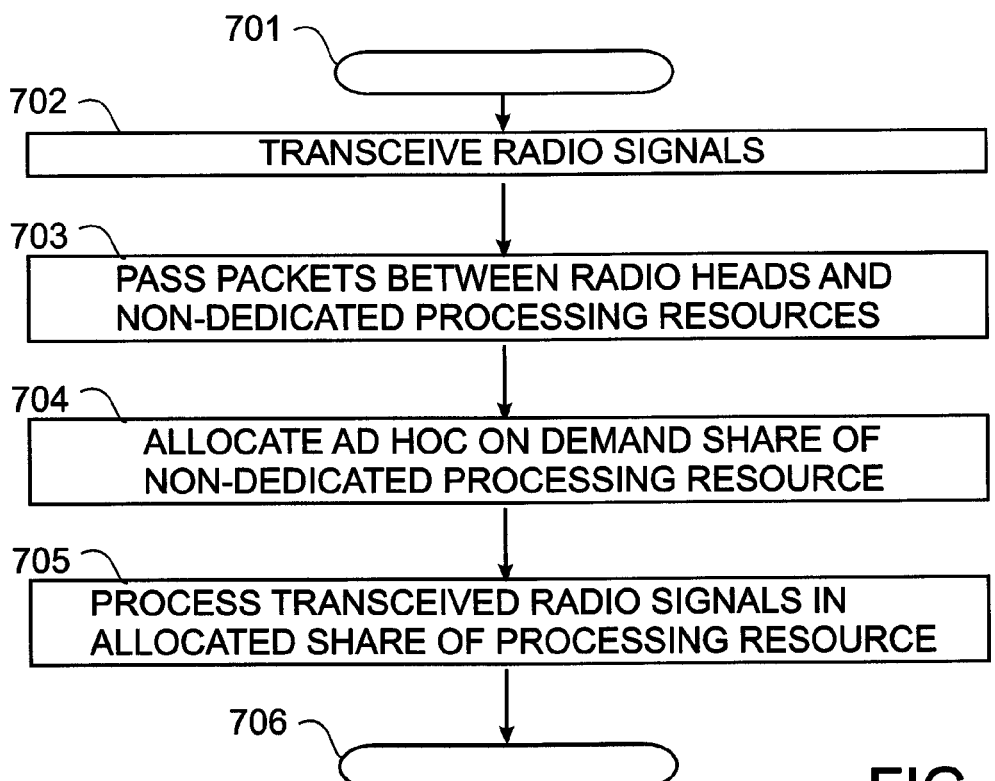
FIG. 7 shows a schematic flow chart of a method according to one of the teachings disclosed herein.

FIG. 7 shows a schematic flow chart of a method according to the teachings disclosed herein. After the start of the method at 701, the radio signals are transceived at block 702. The term "transceiving" is intended to describe transmission, reception, or both of radio signals. At block 703, the data packets are passed between the radio heads and non-dedicated processing resources. The term "non-dedicated" as used herein means that the processing resource is not assigned to a particular one of the radio heads in a fixed manner. As mentioned earlier, the term "radio head" also includes active antennas.

A share of the non-dedicated processing resource(s) is/are allocated ad hoc, on demand at 704. Accordingly, a specific share of the non-dedicated processing resources may perform signal processing tasks or other tasks for a first antenna site during a first period of time, and for a second antenna site at a second period of time. Allocation of the shares of the non-dedicated processing resources is flexible and one of the few conditions that have to be met is that sufficient processing power is available in total to be able to handle peak processing demands averaged across all of the BTS sites ascribed to a particular BTS hotel or set of interconnected BTS hotels.

At 705 of the flowchart shown in FIG. 7, the transceived radio signals are processed in the allocated share of the non-dedicated processing resource. In the transmit or downlink direction, processing typically includes the generation of carrier data on the basis of user baseband signals (e.g. voice signals). Typically, also some sort of scrambling or spectrum spreading is performed at this stage to make the transmission of data to the mobile station more reliable and/or secure. Note that for the transmission case the order of the actions typically is different from that shown in FIG. 7. For example, the order could be: action 704 (allocation of share of non-dedicated processing resource), action 705 (processing of the signal to be transmitted in the allocated share of the processing resource), action 703 (passing the created data packets to the radio head or the active antenna), and then action 702 (transmission of the radio signals).

In the receive or uplink direction, signal processing at 705 typically comprises descrambling the receive signals and converting them to user data packets.

Figure 8:
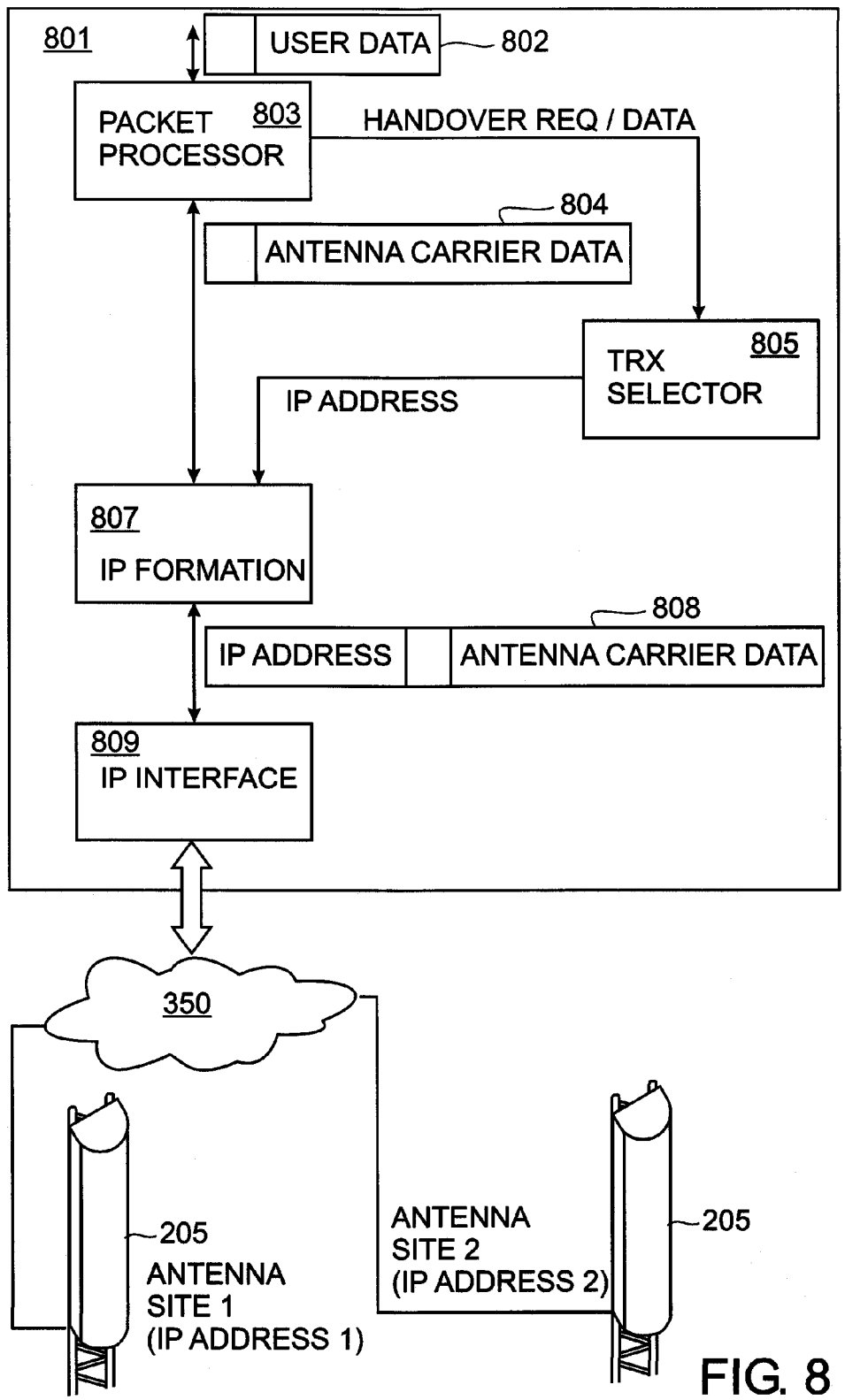
FIG. 8 shows a schematic block diagram of a shared digital signal processing resource according to one of the teachings disclosed herein.

FIG. 8 shows a mixture of a block diagram and a processing diagram for a share of the non-dedicated processing resource(s) 801. The transmit or downlink case is first considered. User data 802 as provided via the backhaul network is processed by a packet processor 803. The packet processor 803 converts the user data 802, which may already be present in the form of data packets, to data packets of antenna-carrier data 804. These data packets are provided to an IP formation unit 807. The IP formation unit 807 inserts the antenna-carrier data (packet) 804 into an IP packet 808. An IP address for the IP packet 808 is provided by a transceiver selector 805. An IP interface 809 transmits the IP packet 808 over the switched network 350 to the antenna site having the IP address selected by the transceiver selector 805.

In known mobile communications networks, the handover from one BTS site to another BTS site is achieved by re-routing of the user data from one cell site to another cell site, using some form of switching centre. This necessitates a large amount of data flowing to and from this cell site, making its OPEX high. The structure illustrated in FIG. 8 makes possible an alternative handover process. The antenna-carrier data may be re-routed from one active antenna site ("BTS") to another at a packet level (e.g. using IP), rather than requiring the intervention of the mobile switching centre or equivalent (there are typically only 3 or 4 mobile switching centres per operator and country). In some of the commercially used standards, the handover is initiated by the mobile station, i.e. the handset of the user. The mobile station compares the signal quality of the radio signals the mobile station receives from mobile communications antennas in its vicinity. The mobile station checks whether better signal quality could be achieved by having the radio communication transferred to another one of the antenna sites, i.e. the new antenna site. The mobile station may then send a handover request and any necessary handover data to the mobile communications network, for example using special handover request data packets sent over a signalling channel of the communication between the mobile station and the antenna site. Alternatively, the switching centre could receive the signal quality information from the handset, for the present site and the new site, and instruct the network to perform a hand-over. These handover request data packets may be detected by the packet processor 803. The packet processor 803 extracts the handover request and/or the handover data and forwards the handover request and/or the handover data to the transceiver selector 805. The transceiver selector 805 may then identify the new antenna site that the mobile station has chosen and determine the antenna site's IP address, for example by querying a data base or a look-up table.

A short example will illustrate the proposed handover process. Assume the mobile station is in radio link communication with antenna site 1. The mobile station has detected over a certain period of time (e.g. a number of seconds or minutes) that the antenna site 2 appears to offer better signal quality than the antenna site 1. The mobile station then initiates the handover request by sending the handover request data packet to antenna site 1. The handover request data packet includes an identification number (ID) of antenna site 2. The handover request data packet is forwarded by the antenna site 1 via the switched network 350 to the shared processing resource 801. The handover request data packet undergoes normal packet handling in IP interface 809 and IP formation unit 807 (in this case acting as an IP extraction unit). As mentioned above, the packet processor 803 extracts the handover information from the data packet. The transceiver selector 805 changes a status of the communication with the requesting mobile station by modifying the antenna site preferred by the mobile station as specified in the handover request data packet. Accordingly, the transceiver selector 805 will start to insert an IP address 2 into the IP packets 808 that belong to the communication with the requesting mobile station. This state will prevail until the communication is terminated or the mobile station requests a further handover. In this manner, a large number of the handovers can be handled directly by the shared non-dedicated processing resource(s) 801. Only in situations in which the user completely leaves the coverage area served by the shared non-dedicated processing resource(s) 801, it will be necessary to involve the mobile switching centre 217 (see FIG. 2).

Note that the handover may be initiated not by the mobile station but by another component of the mobile communications network. The basic idea how a handover request is being processed would still be similar.

Figure 9:
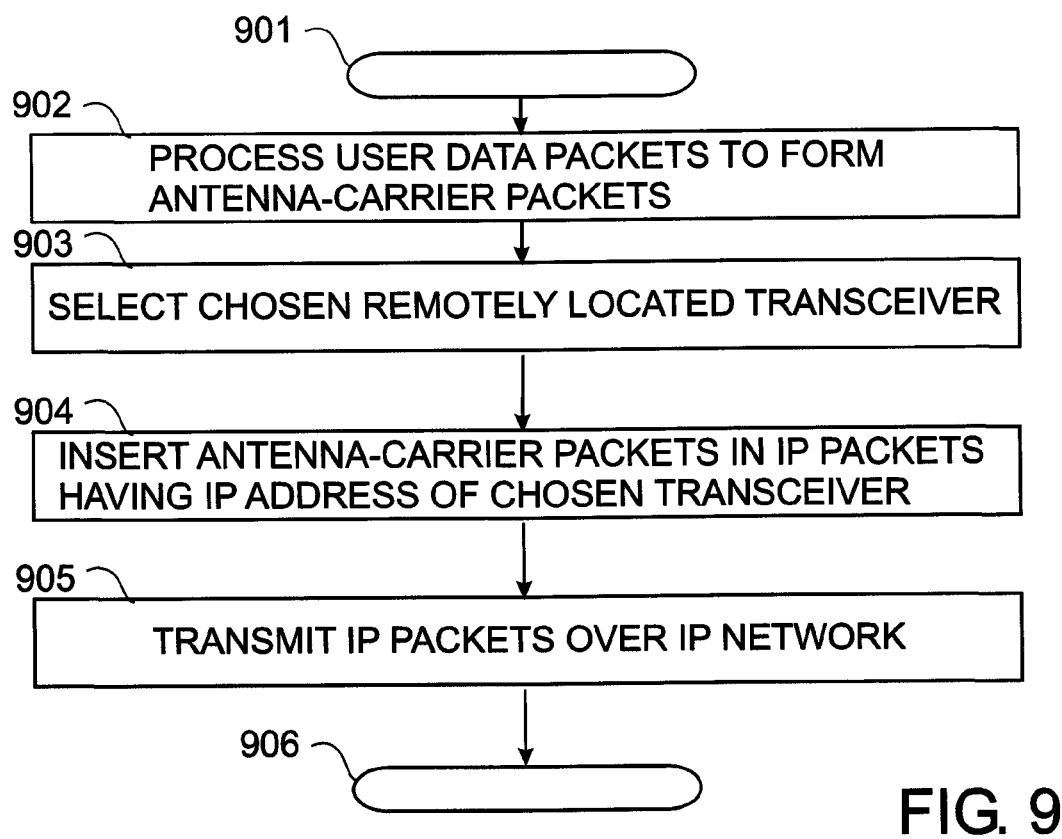
FIG. 9 shows a schematic flow chart of a method for handover according to one of the teachings disclosed herein.

FIG. 9 shows a schematic flow chart of a method for the handover handled by the BTS hotel(s) 310, 410 and/or the shared non-dedicated processing resource(s) 801 themselves. After the process has started at 901, the user data packets are processed to form antenna-carrier packets at 902. At block 903, a chosen remotely located transceiver is selected as specified by the mobile station in an initial request for establishing communications or in a most recent handover request. The antenna-carrier packets are inserted in the IP packets having the IP address of the chosen remotely located transceiver, at 904. These IP packets are then transmitted over the IP network 350 at 905. The method ends at 906 and may be repeated for new user data packets.

FIG. 9 illustrates the downlink case. For the uplink case, the process is simpler, because the IP address of the IP packets transmitted via the IP network 350 does not depend on the handover request issued by the mobile station. The chosen remotely located transceiver (for example the active antenna 205 at antenna site 1) knows from information embedded into the receive signal that it is in charge of forwarding the receive signal to the shared non-dedicated processing resource 801. Likewise, the active antenna 205 at the antenna site 2 will ignore these receive signals and will not forward the receive signals, because the receive signals sent over from the mobile station do not address the antenna site 2.

Figure 10:
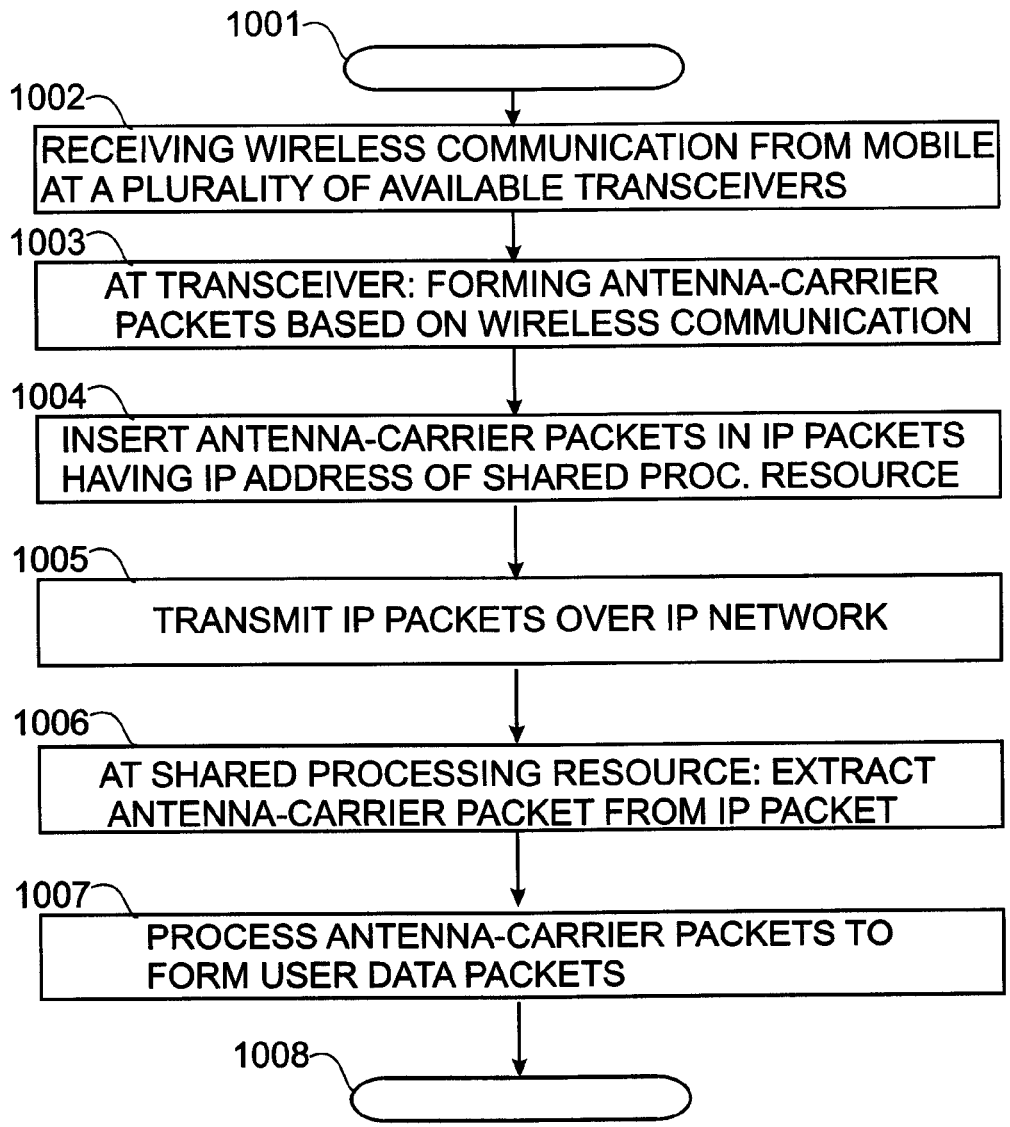
FIG. 10 shows a schematic flow chart of a method for shared data and/or signal processing according to one of the teachings disclosed herein.

FIG. 10 shows a schematic flowchart for a method of performing signal processing tasks at shared processing resources for the receive direction, i.e. the uplink direction. After the start of the method at 1001, wireless communication from a mobile station is received at a plurality of available transceivers, as shown in block 1002. As the operators of mobile communications networks have increased the density of base stations to improve the coverage, the mobile station will often be in a position to establish wireless communication with several base stations, especially in urban areas. Depending on the communications standard the mobile station and the base stations are operating under, the mobile station will typically choose one of the plurality of base stations. The chosen base station will detect that it is in charge of handling the forwarding of the wireless communication and perform the necessary actions, as will be described below. The other base stations will only perform a first part of the processing of the wireless communication until they are capable of extracting enough information from the wireless communication to determine that they may ignore the wireless communication in question.

At the chosen base station, antenna-carrier packets based on the wireless communication are formed (block 1003). In a subsequent action 1004, the antenna-carrier packets are inserted in the IP packets having the IP address of a shared processing resource. The IP address may be pre-determined, for example in a configuration file for the antenna site. In this case, the shared processing resource with the pre-determined IP address acts as a default processing resource for this antenna site. The default processing resource may perform any required data processing itself or it may forward the IP packets to another shared processing resource if the default processing resource is operating close to its capacity limit at this time.

At 1005, the IP packets are transmitted over the IP network. Due to the IP address, the IP network routes the IP packets to the shared processing resource having the IP address. The use of an IP network is an example only to illustrate the ideas disclosed herein.

At the shared processing resource, the antenna-carrier packets are extracted from the IP packets (block 1006). At block 1007 in FIG. 10, the antenna-carrier packets are processed to form user data packets. The method ends at 1008.

Figure 11:
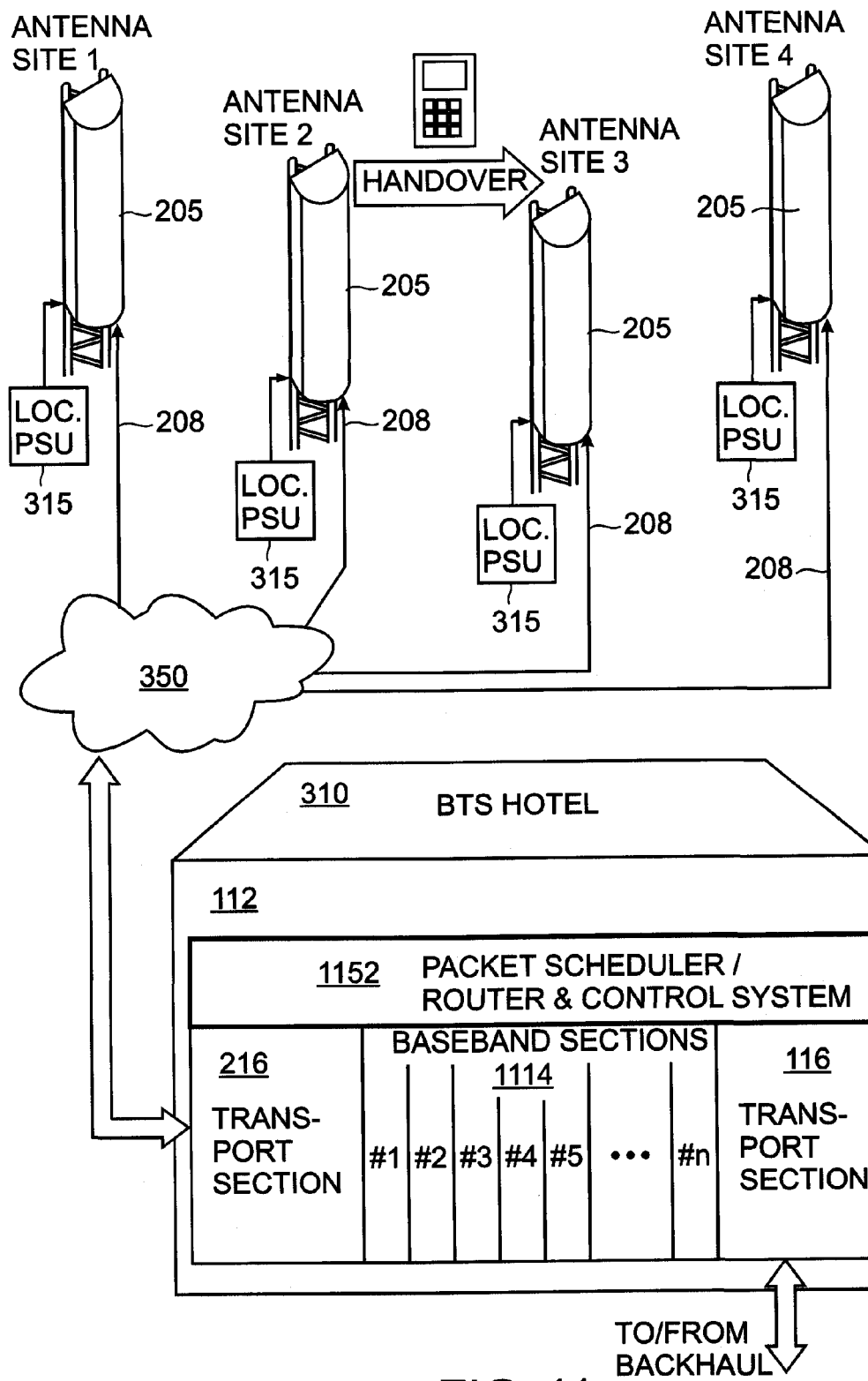
FIG. 11 shows a schematic block diagram of an active antenna-based BTS/network architecture implementing a new type of handover according to one of the teachings disclosed herein.

FIG. 11 shows the use of a packet-switching/scheduling/routing module 1152, within the BTS hotel 310, to enable the baseband handover process to operate. This module 1152 routes the incoming data packets to the relevant (free) shared baseband resource and, once the incoming data packets have been processed (i.e. converted into a modulated antenna-carrier signal), the shared baseband resource then routes the antenna-carrier packet to the relevant cell-site active antenna (or remote radio head, RRH). The active antenna/RRH has an IP-based (or similar) digital input capability, along with suitable packet buffering and a process to convert the packet information into a continuous antenna-carrier data stream for transmission by the active antenna or RRH.

The BTS hotel 310 shown in FIG. 11 comprises a plurality of n baseband sections 1114. These baseband sections 1114 may be freely assigned to the antenna sites, four of which are illustrated in FIG. 11. Assignment of one of the plurality of baseband sections 1114 may be ad hoc and/or on demand, based on the workload of the baseband sections 1114. Certain aspects of the assignment of the plurality of baseband sections 1114 may be controlled by the packet scheduler/router and control system 1152.

The mobile station that is first in wireless communication with the antenna site 2 may be handed over to the antenna site 3 in a simple manner. As far as the BTS hotel 310 is concerned, it does not make much of a difference whether the data packets belonging to the wireless communication between the mobile station and the antenna site 2, or later the antenna site 3, are forwarded by the antenna site 2 or the antenna site 3. The BTS hotel 310 and the packet scheduler/router and control system 1152 may simply look at a user identification with which the data packets are tagged, such as the identification provided by a SIM card. Thus, the packet scheduler/router and control system 1152 may keep the data processing tasks with the baseband section 1114 that was in charge prior to the handover.

As far as the antenna sites are concerned that are involved in the handover process (the antenna site 2 and the antenna site 3), superfluous network traffic in the switched network 350 can be avoided if that antenna site, which is not currently chosen by the mobile station, does not forward the data packets to the BTS hotel 310. In FIG. 11, the antenna site 2 is in charge prior to the initiation of the handover process and the antenna site 3 is in charge after the handover.

FIG. 12 shows a remote radio head 107 and an antenna 105 that may be used in a network architecture as disclosed herein. In some current BTS installations, a local absolute timing reference may be provided, often utilizing a GPS receiver. This provides a very accurate indication of absolute time (typically based on UTC/GMT) and enables the base stations in a network to be accurately synchronized. This is necessary in some CDMA systems, for example, to enable soft-handover to operate correctly. This timing information forms the basis for the timing used by the remote radio head, since the BTS rack and the remote radio head are directly connected in known BTS installations.

It would be desirable to be able to move the remote radio head further from the remainder of the BTS, to enable the remainder of the BTS to be co-located with similar parts of other BTSs (for an entire city, for example). This is known as "BTS hoteling" and involves all of the baseband/control/transport parts of a number of base stations being hosted at the same location. In order to achieve this, however, it would be necessary (with current approaches) to utilize dedicated fibre-optic links from the BTS baseband sections to their respective RRHs. This would be prohibitively expensive in most circumstances. The use of existing fibre-optic networks is not an option, since they employ switching and routing systems that introduce a degree of uncertainty into the end-to-end timing. This would result in an unknown cell radius, which could even change day by day or hour by hour, as the routing of the baseband data changed to reflect the overall traffic (cellular and non-cellular) on the public fibre network. Without further measures, the BTS hotel systems are excluded from using available switched networks and this is a reason why they have not been deployed to any significant degree, to date.

The way to overcome this problem is to provide a low-cost, high-accuracy timing reference at the remote radio head end of the system. Typically, the high-accuracy timing reference is provided as an integral part of the RRH or the active antenna itself. The high-accuracy timing reference needs to be both stable and provide direct indication of UTC (or some other absolute time reference). The use of Caesium atomic clocks, which are typically deployed elsewhere in the mobile communications network, is not an option due to their extremely high cost and also their size/weight. A better, low-cost option is to utilize a GPS-based clock. In FIG. 12, a GPS receiver 1273 is mounted on the top of the antenna 105. A GPS receiver cable 1274 connects the GPS antenna 1273 with a GPS receiver 1275. In most cases, the positioning of an RRH/active antenna on a mast offers a good view of the sky so that the GPS receiver 1273 should enjoy a good reception of the GPS signals issued by the GPS satellites. Hence, one of the major issues with the use of GPS timing solutions in the BTS systems, namely that of locating a GPS antenna somewhere suitable, is solved.

FIG. 13 shows an active antenna 205 equipped with the GPS antenna 1273, the GPS receiver cable 1274, and the GPS receiver 1275. Reference is made to the previous explanations with respect to FIG. 12.

The remote radio head 107 and the active antenna 205 may now time-synchronize the transmission and/or the reception of wireless communication with the mobile stations. This may be achieved by time-stamping the packets relayed by the remote radio head 107 or the active antenna 205. The baseband section 114, 514, 1114 will take the value provided by the absolute timing reference into account to determine the true cell radius measured from the antenna site.

The form of transport within the switched network 350 is, up to a certain extent, transparent to the BTS system. The BTS system no longer has to rely upon timing information that is transmitted back and forth via the link between the BTS system and the remote radio head 107 (or the active antenna 205), since this is now obtained locally by the active antenna 205 or the RRH 107.

Note that there are emerging low-cost timing solutions, based upon, for example, phase-locked amplifier techniques, which have the potential for integration and hence a much lower cost base than that of GPS solutions.

FIG. 14 shows a schematic block diagram of an active antenna 205 with integrated absolute timing reference 1405. The active antenna 205 comprises a transmit/receive module 1402 that is connected to a plurality of antenna elements 608. For downlink communications (from the active antenna to the mobile station) the transmit/receive module 1402 is adapted to time-synchronize the transmission of certain portions of the transmit signal belonging to the wireless communication. The transmit/receive module 1402 is connected to the absolute timing reference 1405 and also to a packet analyzer 1406. The packet analyzer receives packets from the network interface 601 that the active antenna 205 has received from the switched network 350. The packet analyzer 1406 extracts a timing information from the packets and forwards it to the transmit/receive module 1402. Note that the functionality of the packet analyzer 1406 could be included in the interface 601 or the transmit/receive module 1402. The timing information 1407 extracted from the data packets is compared with the current time provided by the absolute timing reference 1405. The transmission of the particular portion of the transmit signal is initiated when the current time substantially matches the timing information 1407. In this manner, the base station 112 or the BTS hotel 310, 410 can rely on the transmission of the mentioned portion of the transmit signal to happen at a certain, pre-determined time, under normal circumstances. A warning or an error message can be sent to the base station or the BTS hotel if the transmission delay introduced by the switched network 350 is too large so that the transmission at the pre-determined time would no longer be possible.

In the receive direction (uplink), the active antenna 205 does not have control over when a certain portion of the receive signal is actually received at its antenna elements 608. However, the data packet containing receive signal information may comprise the time of reception. The time of reception may then be evaluated by the base station 112 or the BTS hotel 310, 410. The absolute timing reference 1405 sends receive timing information 1408 to the interface 601 to be included in the packets which are to be sent to the base station or the BTS hotel via the switched network 350.

Figure 15:
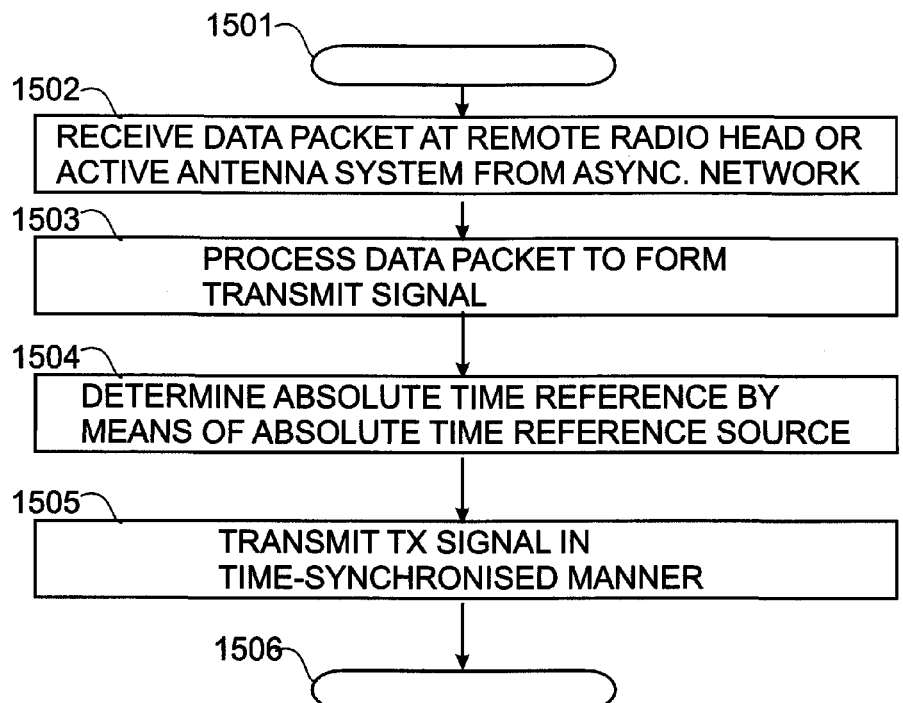
FIG. 15 shows a schematic flowchart of a method for time-synchronizing transmission at a remote radio head or an active antenna system.

FIG. 15 shows a schematic flowchart of a method for time-synchronized transmission. After the start of the method at 1501, the data packet (or several ones of the data packets) is received at the remote radio head or the active antenna system from an asynchronous network such as the switched network 350 (at 1502). The data packet is processed, at 1503, to form the transmit signal. At 1504, an absolute timing reference is determined by means of an absolute timing reference source. In a subsequent action 1505, the transmit signal is transmitted in a time-synchronized manner, for example exactly at a pre-determined time specified in the data packet (within the accuracy of the absolute timing reference source).

Figure 16:
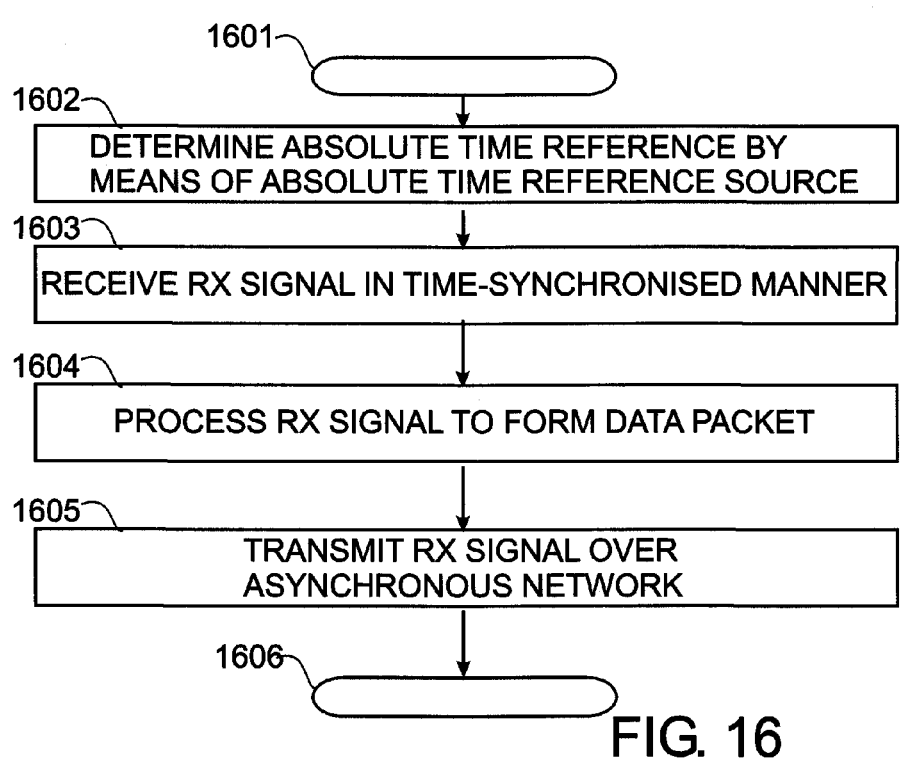
FIG. 16 shows a schematic flowchart of a method for time-synchronizing reception at a remote radio head or an active antenna system.

FIG. 16 shows a schematic flowchart of a method for the receive direction. After the start of the method at 1601, an absolute timing reference is determined by means of the absolute timing reference source, at 1602. In a subsequent action 1603, the receive signal is received in a time-synchronized manner. Typically this means that the time at which the receive signal was actually received is recorded for subsequent use. At 1604, the receive signal is being processed to form a data packet (or several data packets). As can be seen in block 1605 of the flowchart, the receive signal is transmitted over an asynchronous network. Finally, the method ends at 1605.

The detrimental influence of an uncertain delay introduced by the switched network 350 is remedied by providing for a time-synchronized transmission and/or reception at the antenna site itself. This is made possible by the antenna site comprising, or having access to, an absolute timing reference with the required precision. This works as long as the transmission delay introduced by the switched network 350 is not too large. The proposed solution makes the link between the base station 112 or the BTS hotel 310, 410 and the antenna site transparent. Note that any timing information provided by the base station 112 or the BTS hotel 310, 410 for the purposes of the mobile station may need to be modified by the antenna site to insert the actual transmission/reception time.

Figure 17:
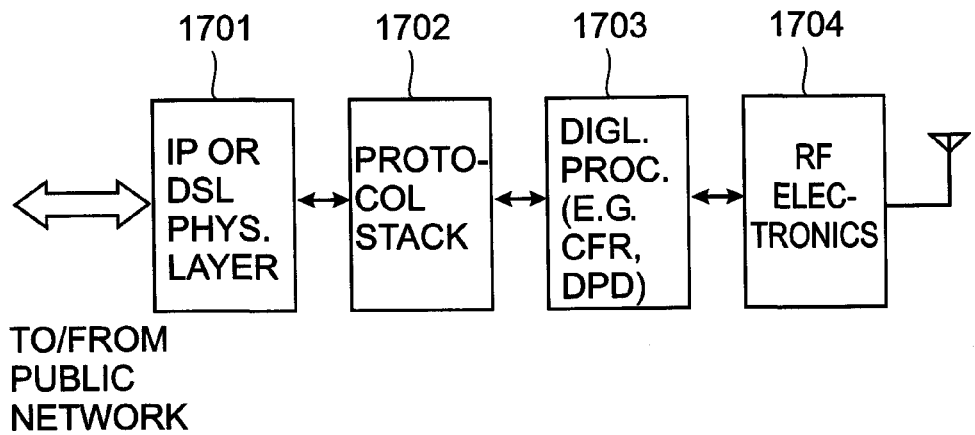
FIG. 17 shows a schematic block diagram of an active antenna system according to one of the teachings disclosed herein.

FIG. 17 shows the basic elements required in an IP-based (or other packet-based) RRH or active antenna system. The difference between this diagram and that of a conventional RRH is that a CPRI or OBSAI synchronous interface has been replaced by an IP or DSL (or similar) physical layer and a packet processing subsystem, the detailed operation of which is summarized in FIG. 18. The baseband processing elements, including (where relevant) digital up-conversion, crest factor reduction, beamforming processing, digital pre-distortion and A/D and D/A conversion, remain unchanged from existing RRH or active antenna system designs.

The RRH comprises a physical layer interface 1701 for IP or DSL which connects the RRH or the active antenna with the public communications network. A protocol stack 1702 is connected to the physical layer interface 1701. Digital processing for the purposes of crest factor reduction (CFR), digital pre-distortion (DPD), or other purposes is performed in a block 1703. A radio frequency electronics module 1704 conditions the transmit signal for transmission to the mobile station. In the other direction the radio frequency electronics module 1704 conditions signals received from the mobile station for subsequent digital processing within the digital processing block 1703.

Figure 18:
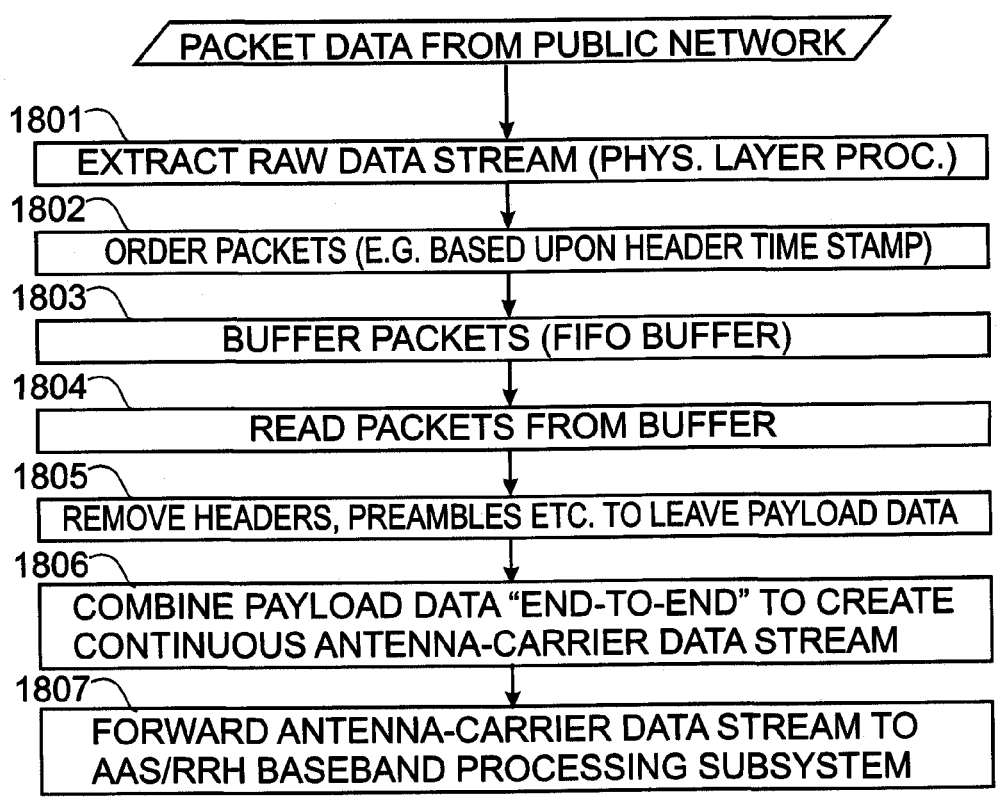
FIG. 18 shows a schematic flowchart of a method for handling packet-based data at a remote radio head or an active antenna system.

FIG. 18 provides an example breakdown of the functionality required in the new packet-based digital input to the active antenna system or the remote radio head. The flowchart shown in FIG. 18 is valid for the transmit direction. A corresponding flowchart for the receive direction may be easily derived from the teachings disclosed herein. At an origin of the method, packet data is received from the public communications network. In step 1801, the raw data is extracted from the transmission medium (e.g. fibre optic or copper cable) by means of physical layer processing. The data packets are then ordered, for example based upon a header time-stamp, at 1802. At 1803, the ordered data packets are fed into a local FIFO buffer. The data packets arriving at the RRH or the active antenna system may have taken a variety of physical paths in getting to the active antenna system or the RRH and hence may not arrive in the correct time-order (or correct sequence). Step 1802 reads from the input buffer and orders the data packets, based upon the time-stamp or other header sequencing information, before placing them (in the correct sequence) in the main FIFO buffer (step 1803). The data packets are then read from the buffer (step 1804) at the required rate to (ultimately) provide a continuous antenna-carrier data string, at the correct bit-rate, to feed the RRH's or the active antenna system's digital processing circuitry. In step 1805, the overhead information (packet headers, preamble information, etc.) is removed from the data packets to leave the wanted payload data. This payload data is then placed "end-to-end" (step 1806) to form a continuous data stream of the antenna-carrier data. Finally, this continuous data stream is forwarded to the active antenna system's or the remote radio head's baseband processing circuit (step 1807). From this point onwards in the system, the data is treated in exactly the same way as equivalent data which would have arrived, in an existing implementation, via CPRI or OBSAI (or similar).

Note that the order of some of the steps may be altered, without loss of functionality. For example, it is possible to strip the overhead (e.g. preamble and header) information from the data packets, prior to loading them into the FIFO stack/buffer. Thus, the entries in this buffer now consist purely of small parts of the wanted antenna-carrier data (plus any embedded control data etc.—a separate step, not shown in the diagram, would form this control data into a separate data stream to be fed separately to the digital subsystem). Such control data is typically not time sensitive (within reasonable bounds) and is generally at a low data rate. The antenna-carrier data stream is now formed directly from placing the antenna-carrier information, extracted from the buffer "end-to-end", to form a continuous stream of data.

The invention also includes mechanisms to:
recognize the existence of missing packets by use of the packet header timing/sequencing information (or similar),
locally insert "dummy" packets to replace missing packets, in the event of transmission errors.

Note that these steps are not included in FIG. 18.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer useable medium such as semiconductor, magnetic disc, or optical disc (e.g., CD-ROM, DVD-ROM, etc.). The software can also be disposed as computer data embodied in a non-transitory computer useable (e.g. readable) transmission medium (e.g., solid state memory any other non-transitory medium including digital, optical, analogue-based medium, such as removable storage media). Embodiments of the present invention may include methods of providing the apparatus described herein by providing software describing the apparatus and subsequently transmitting the software as a computer data signal over a communication network including the internet and intranets.

It is understood that the apparatus and method described herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A mobile communications network comprising:
a plurality of radio heads for transceiving radio signals and for converting the radio signals between baseband representations of the radio signals and radio frequency representation of the radio signals;
a cloud processing architecture with localized timing references for processing the baseband representations of the radio signals and ad hoc allocating on demand between different ones of the plurality of radio heads a share of non-dedicated cloud processing resources, from among the plurality of the sharable cloud processing resources, for processing the baseband representations of the radio signals belonging to different ones of the plurality of radio heads by using the localized timing references in the allocated share of the cloud processing resources and
a plurality of radio head links between the plurality of radio heads and the cloud processing architecture with localized timing references;
wherein the plurality of radio heads have a radio head timing reference to compensate for delays introduced by the plurality of radio head links when the delays are time varying and/or random.

2. The mobile communications network of claim 1, further comprising:
a base station implemented in the non-dedicated cloud processing resources.

3. The mobile communications network of claim 2, further comprising:
a base station timing reference.

4. The mobile communications network of claim 1, further comprising:
a cloud processing architecture timing reference.

5. The mobile communications network of claim 1, further comprising:
a PSTN link as a part of the plurality of radio head links between the plurality of radio heads and cloud processing resources.

6. The mobile communications network of claim 1, wherein the plurality of radio heads comprise at least one of an upconverter and a downconverter adapted to frequency-convert the radio signals.

7. The mobile communications network of claim 1, wherein the demand for allocating a share of the cloud processing architecture with localized timing references is based on a number of users connected to a given radio head.

8. The mobile communications network of claim 1, wherein the demand for allocating a share of the cloud processing architecture with localized timing references is based on an amount of data downloaded or uploaded via the radio head.

9. The mobile communications network of claim 1, wherein the cloud processing architecture with localized timing references is adapted to re-route packets of the baseband representation of the radio signals belonging to different ones of the plurality of radio heads during a hand-over process.

10. A method for processing radio signals for a mobile communications network comprising the steps of:
   transceiving the radio signals;
   converting the radio signals between baseband representations of the radio signals and radio frequency representations of the radio signals;
   passing packets of the baseband representations of the radio signals between a plurality of radio heads and a plurality of non-dedicated cloud processing resources of a cloud processing architecture with localized timing references via a plurality of radio head links;
   ad hoc allocating on demand between different ones of the plurality of radio heads a share of the non-dedicated cloud processing resources, from among the plurality of shareable non-dedicated cloud processing resources, for processing the baseband representations of the radio signals belonging to different ones of the plurality of radio heads by using the localized timing references in the allocated share of the cloud processing resources;
   processing the baseband representations of the radio signals belonging to different ones of the plurality of radio heads in the allocated share of the cloud processing resources; and
   providing a radio head timing reference locally to a radio head in the plurality of radio heads to compensate for delays introduced by the plurality of radio head links when the delays are time varying and/or random.

11. The method of claim 10, further comprising:
   providing a base station timing reference locally to a base station that is part of the mobile communications network.

12. The method of claim 10, further comprising:
   providing a timing reference locally to at least one non-dedicated processing resource of the plurality of non-dedicated processing resources.

13. The method of claim 10, wherein the packets of the baseband representations of the radio signals are passed over a PSTN network.

14. The method of claim 10, further comprising:
   at a radio head of the plurality of remote radio heads, frequency-converting the radio signals.

15. The method of claim 10, wherein the demand for allocating a share of the cloud processing architecture with localized timing references is based on a number of users connected to a given radio head.

16. The method of claim 10, wherein the demand for allocating a share of the cloud processing architecture with localized timing references is based on an amount of data downloaded or uploaded via the radio head.

17. The method of claim 10, wherein the baseband representation of the radio signals belonging to different ones of the plurality of radio heads are rerouted during a hand-over process.

18. A computer program product comprising a non-transitory computer-usable medium having control logic stored therein for causing a computer to manufacture a mobile communications network comprising:
   a plurality of radio heads for transceiving radio signals and for converting the radio signals between baseband representations of the radio signals and radio frequency representations of the radio signals;
   a cloud processing architecture for processing the baseband representations of the radio signals and ad hoc allocating on demand between different ones of the plurality of radio heads a share of non-dedicated cloud processing resources, from among the plurality of the sharable cloud processing resources, for processing the baseband representations of the radio signals belonging to different ones of the plurality of radio heads by using the localized timing references in the allocated share of the cloud processing resources;
   a plurality of radio head links between the plurality of radio heads and the cloud processing architecture with localized timing references; and
   wherein the plurality of radio heads have a radio head timing reference to compensate for delays introduced by the plurality of radio head links when the delays are time varying and/or random.

19. A computer program product comprising a non-transitory computer-usable medium having control logic stored therein for causing a computer to manufacture a mobile communications network comprising the steps of:
   transceiving the radio signals;
   converting the radio signals between the baseband representations of the radio signals and radio frequency representations of the radio signals;
   passing packets of the baseband representation of the radio signals between a plurality of radio heads and a plurality of non-dedicated cloud processing resources of a cloud processing architecture with localized timing references via a plurality of radio head links;
   ad hoc allocating on demand between different ones of the plurality of radio heads a share of a non-dedicated cloud processing resource, from among the plurality of shareable cloud processing resources, for processing the baseband representations of the radio signals belonging to different ones of the plurality of radio heads in the allocated share of the cloud processing resources;
   processing the baseband representations of the transceived radio signals belonging to different ones of the plurality of radio heads by using the localized timing references in the allocated share of the cloud processing resources; and
   providing a radio head timing reference locally to a radio head in the plurality of radio heads to compensate for delays introduced by the plurality of radio head links when the delays are time varying and/or random.

* * * * *